May 22, 1951 — W. KOHLHAGEN — 2,554,033

METHOD FOR BALANCING OSCILLATING OR ROTATING MEMBERS

Filed Sept. 10, 1949 — 5 Sheets-Sheet 1

Inventor
Walter Kohlhagen
by Seymour, Earle & Nichols
Attorneys

May 22, 1951 W. KOHLHAGEN 2,554,033
METHOD FOR BALANCING OSCILLATING OR ROTATING MEMBERS
Filed Sept. 10, 1949 5 Sheets-Sheet 2

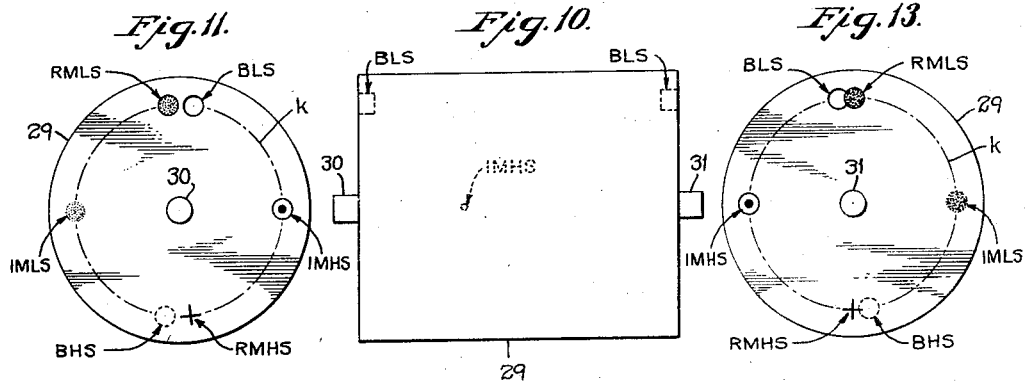

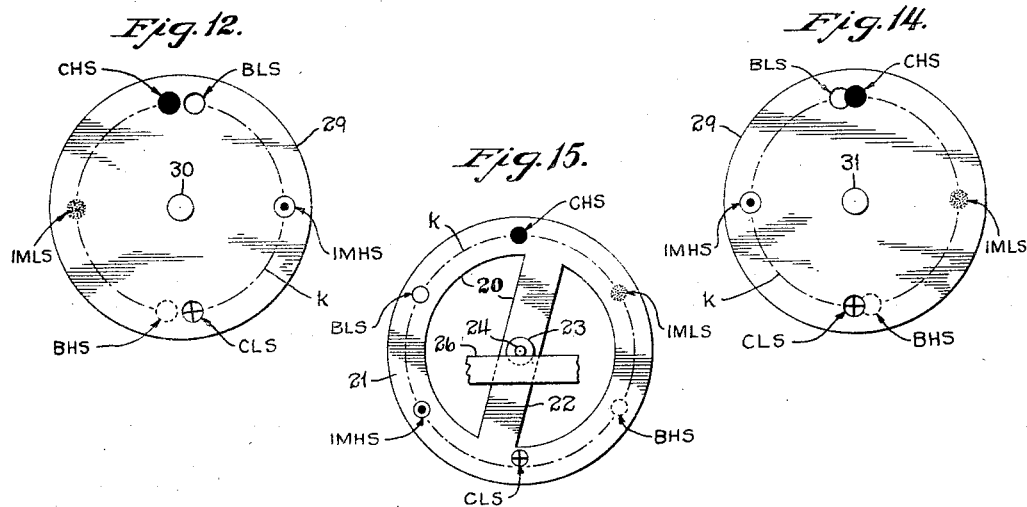

LEGEND:

- ⊛ IMLS = INHERENT MEAN LIGHT SPOT ...
- ⦿ IMHS = INHERENT MEAN HEAVY SPOT ...  } = IMUS = INHERENT MEAN UNBALANCE SPOTS
- ○ BLS = BALANCING LIGHT SPOT ......
- ◌ BHS = BALANCING HEAVY SPOT .....  } = BS = BALANCING SPOTS
- ⊛ RMLS = RESULTANT MEAN LIGHT SPOT
- + RMHS = RESULTANT MEAN HEAVY SPOT  } = RMUS = RESULTANT MEAN UNBALANCE SPOTS
- ⊕ CLS = CORRECTING LIGHT SPOT ......
- ● CHS = CORRECTING HEAVY SPOT .....  } = CS = CORRECTING SPOTS

Inventor
Walter Kohlhagen
by Seymour, Earle & Nichols
Attorneys

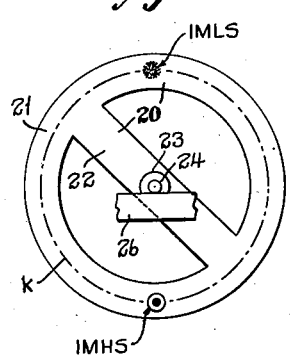
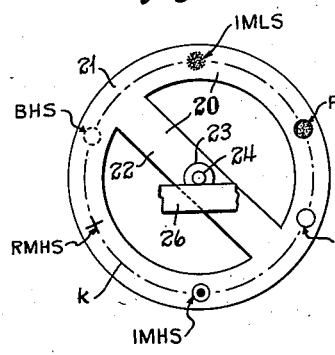
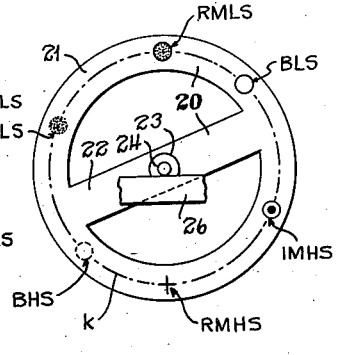
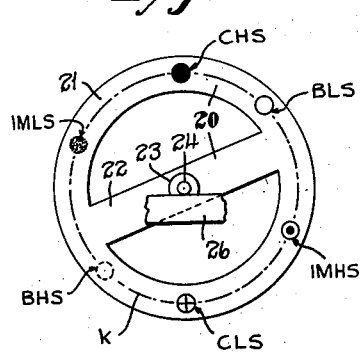
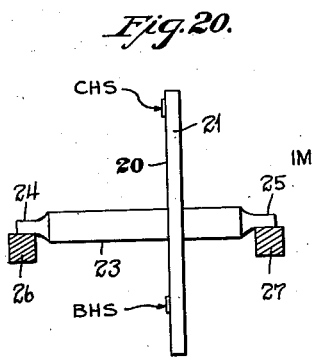
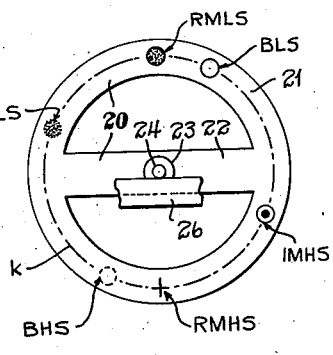
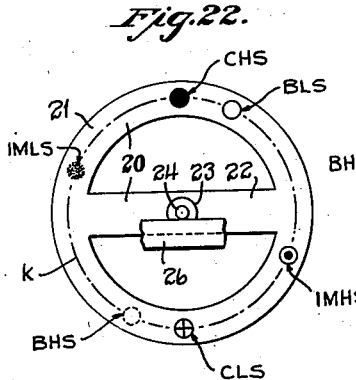
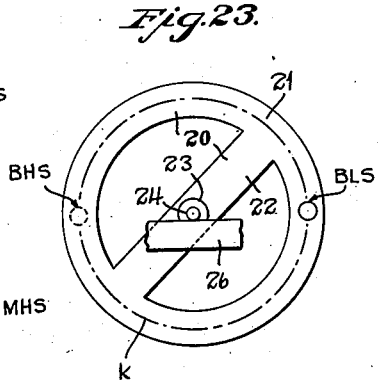
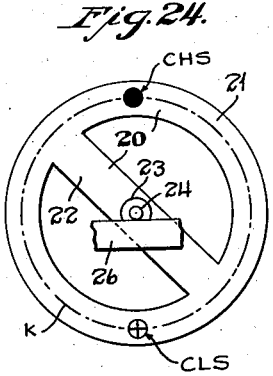

May 22, 1951  W. KOHLHAGEN  2,554,033
METHOD FOR BALANCING OSCILLATING OR ROTATING MEMBERS
Filed Sept. 10, 1949  5 Sheets-Sheet 4
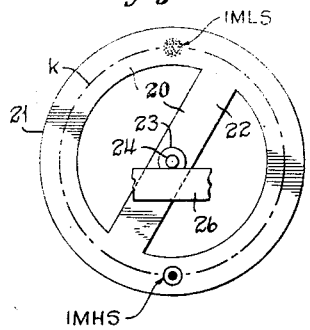
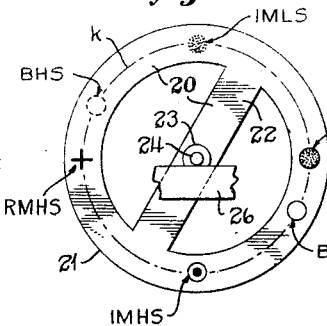
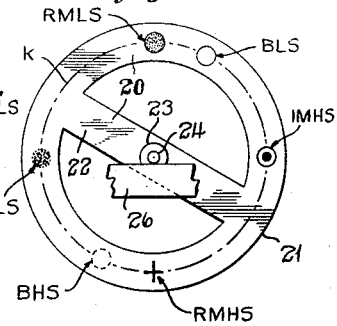
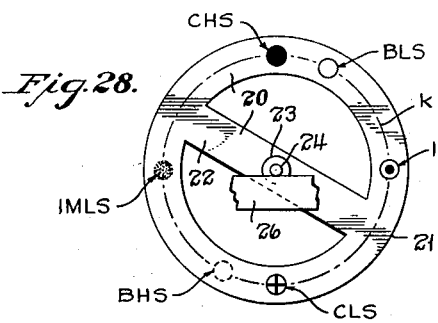
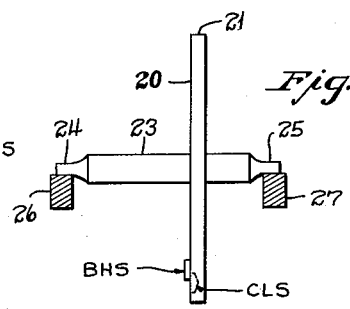
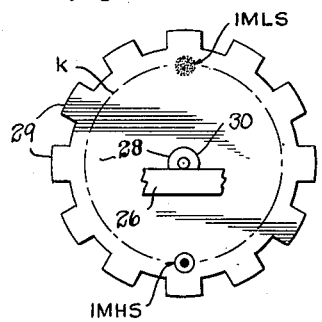
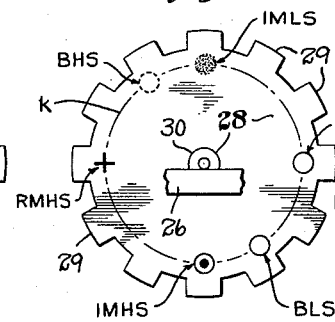
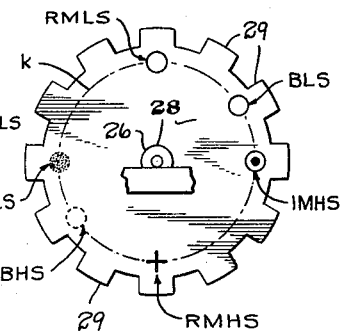
Inventor
Walter Kohlhagen
by Seymour, Earle & Nichols
Attorneys May 22, 1951 W. KOHLHAGEN 2,554,033
METHOD FOR BALANCING OSCILLATING OR ROTATING MEMBERS
Filed Sept. 10, 1949 5 Sheets-Sheet 5

Inventor
Walter Kohlhagen
By Seymour, Earle & Nichols
Attorneys

Patented May 22, 1951

2,554,033

UNITED STATES PATENT OFFICE 2,554,033

METHOD FOR BALANCING OSCILLATING OR ROTATING MEMBERS

Walter Kohlhagen, Elgin, Ill.

Application September 10, 1949, Serial No. 115,027

20 Claims. (Cl. 73—66)

The present invention relates to improvements in methods for balancing oscillating or rotating members, and while the method of the present invention is admirably suited for the poising or balancing of the oscillating balance-wheels of clocks, watches and other time instruments, it is also suitable for balancing other oscillating or rotating members such, for instance, as flywheels, turbine wheels, the rotating members of electric motors, etc.

The present invention constitutes a continuation-in-part of my co-pending application Serial No. 625,977, filed November 1, 1945, now abandoned.

One of the objects of the present invention is to provide a superior method whereby oscillating or rotating members may be balanced or poised at low cost.

Another object of the present invention is to provide a superior method of the character referred to whereby thin oscillating or rotating members may be balanced or poised without requiring the alteration of more than one face thereof.

A further object of the present invention is to provide a superior method of the character referred to and by means of which a plurality of similar members of the same character may be poised or balanced, by the removal or addition of substantially an identical total amount of material, whereby the resultant balanced members may be of substantially uniform weight and inertia.

Still another object of the present invention is to provide a superior method of the character referred to whereby balancing or poising may be effected without requiring an actual measurement of the amount of unbalance in each member of a lot of similar members to be balanced or poised.

A still further object of the present invention is to provide a superior method for balancing oscillating or rotating members whereby a plurality of cuts may be made in or additions of material made to a given member to be poised or balanced, with the assurance, however, that the said cuts or additions will not overlap or interfere with each other.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 4 is a view similar to Fig. 3 but showing the reorientation of the balance-wheel after the formation of the balancing light spot referred to;

Fig. 10 is a view in side elevation of a relatively-long member requiring balancing adjacent each of its opposite ends and shown in a status after being drilled or otherwise cut to provide balancing light spots and prior to the formation of correcting light spots therein;

Fig. 11 is a view of the left end of Fig. 10;

Fig. 12 is a view similar to Fig. 11 but showing a correcting light spot as having been drilled in the left end of the member;

Fig. 13 is a view of the right end of Fig. 10;

Fig. 14 is a view similar to Fig. 13 but showing a correcting light spot as having been drilled in the right end of the member;

Fig. 15 is a view similar to Fig. 8, but illustrating the location of the weight-values at different radii;

Fig. 16 is a schematic face view of a balance-wheel and showing the same as oriented to bring its inherent mean heavy spot directly below the axis of the balance-wheel preparatory to being balanced by means of the method of the present invention;

Figure 3:
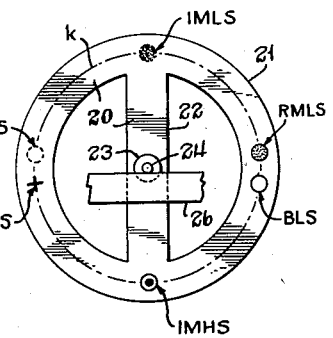
Fig. 3 is a view similar to Fig. 1 but showing a balancing light spot cut in the rim of the balance-wheel.
Figure 4:
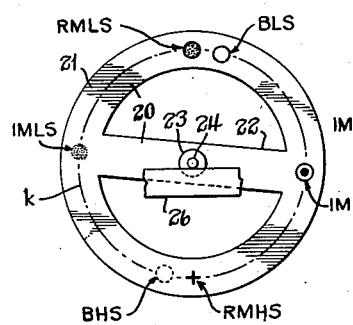
Figure 5:
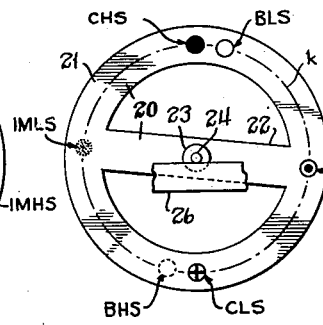
Fig. 5 is a view similar to Fig. 4 but showing the balance-wheel after the same has had a correcting light spot cut in the rim-portion, to thus render the balance-wheel substantially poised or balanced.
Figure 35:
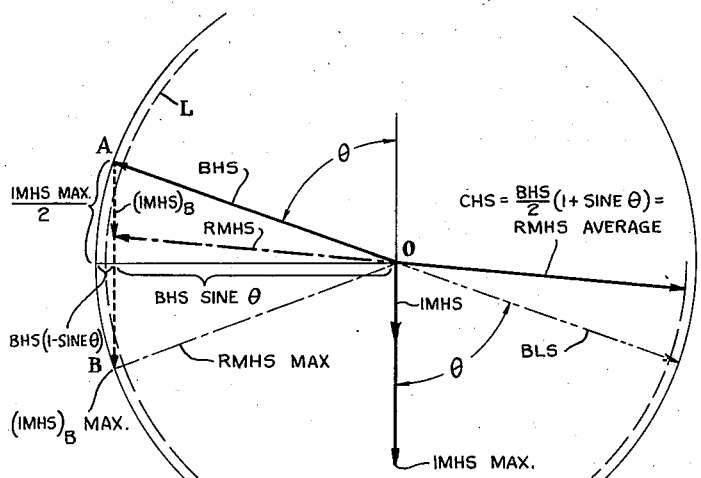
Figure 36:
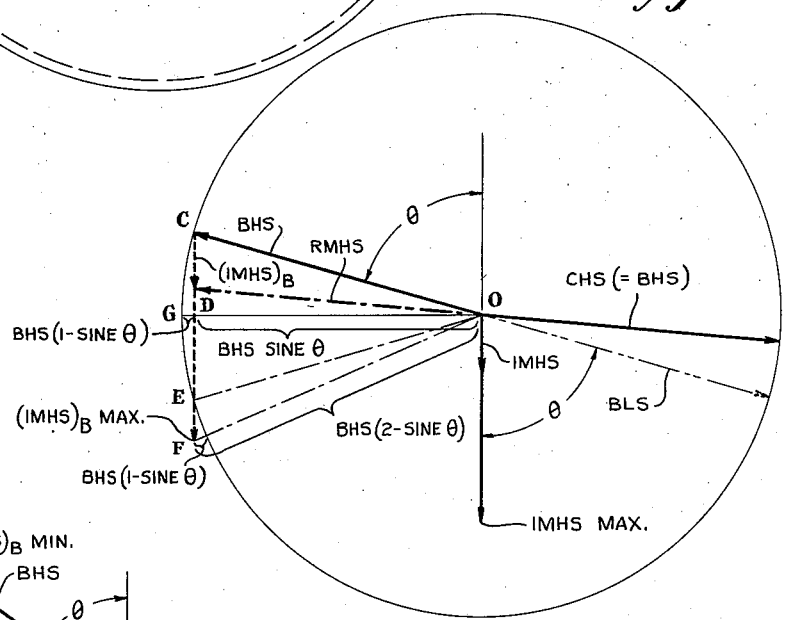
Figure 37:
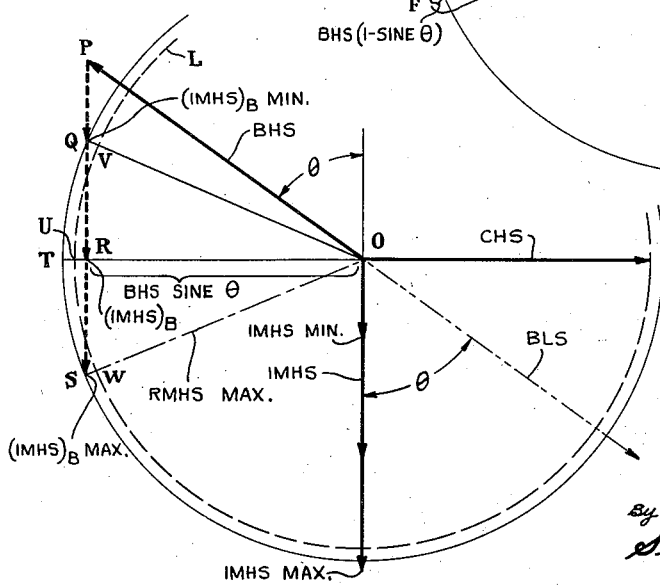

Figs. 17, 18 and 19 respectively correspond to Figs. 3, 4 and 5, but show a mode of balancing by means of the addition of weights to a balance-wheel;

Fig. 20 is a view in edge elevation of the showing of Fig. 19;

Figs. 21 and 22 are respectively similar to Figs. 18 and 19 but showing the effects of lesser inherent unbalance than was the case in connection with the showing of Figs. 16 to 20 inclusive;

Figs. 23 and 24 are respectively similar to Figs. 21 and 22 but showing the effects of the method on a member having substantially zero inherent unbalance;

Figs. 25 to 29 inclusive are views respectively similar to Figs. 16 to 20 but showing a mode of carrying out the present invention wherein material is first added to each group of similar members and material is later removed therefrom;

Figs. 30 to 34 inclusive are views respectively similar to Figs. 25 to 29 inclusive but showing still another mode of carrying out the present invention wherein material is first removed from each of a group of similar members and material is later added thereto;

Fig. 35 shows a vector diagram illustrating a relationship under one set of conditions;

Fig. 36 shows a vector diagram illustrating a relationship under another set of conditions; and Fig. 37 shows a vector diagram illustrating still another set of conditions.

As will appear from the following, various modes of carrying out the present invention may be employed, though for illustrative purposes only four modes will be described, i. e., removing material from a member to be balanced at two different locations therein, adding material to a member to be balanced at two different locations thereon, first adding material to and then removing material from a member to be balanced, and first removing material from a member to be balanced and subsequently adding material thereto.

In several forms to be described hereinafter, the operations will illustratively comprise gravitational orientation of a member wherewith any inherent out-of-balance will be revealed by an inherent mean heavy spot moving to the bottom, followed by a primary weight-changing operation effected by subtracting or adding a known amount of material at a point such that a balancing light spot effect is produced at a known acute angle from the inherent mean heavy spot, followed, in turn, by a further balancing operation during which the member rotates through some undetermined angle dependent upon the relationship of the moment of force established by the inherent mean heavy spot and the moment of force established by the removal or addition of material in the primary weight-changing operation, and finally a known amount of material is removed from or added to the member at a predetermined point on the vertical line through the axis thereof. A feature of the invention is that in a first position of rotation of a member and by means of a primary weight-changing operation, the weight of the member is changed by a known amount at a known radial distance and at a predetermined angle from the vertical line, followed by a second weight-changing operation at a second position of rotation of the member and by a known amount and at a known radial distance on the vertical line, whereby the member can be brought within a predetermined tolerance of accuracy with respect to its balance or poise.

BALANCING BY REMOVING MATERIAL

*The method as illustrated in Figs. 1 to 5 inclusive*

In Figs. 1 to 5 inclusive is illustrated a balance-wheel generally designated by the reference character 20 and comprising an annular rim 21 and an integral diametrical spoke 22—a form of balance-wheel common in the horological art.

Figure 2:
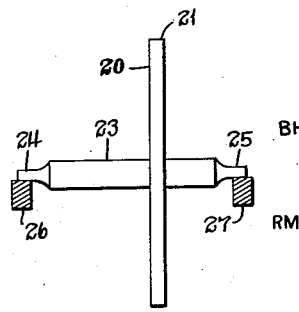
Fig. 2 is an edge view thereof.

Rigid with and extending through the central portion of the spoke 22 of the balance-wheel 20 is a balance-staff 23 projecting beyond each of the respective opposite faces of the balance-wheel and having its longitudinal axis perpendicular with respect to the plane of the balance-wheel, as is especially well shown in Fig. 2.

At each of its opposite ends, the balance-staff 23 is, in accordance with usual practice in the horological art, reduced in size to provide bearing-terminals 24 and 25 respectively located at the opposite extremities of the said balance-staff, as is shown in Fig. 2.

For purposes as will hereinafter appear, the bearing-terminals 24 and 25 of the balance-staff 23 are adapted to rest respectively on the upper surfaces of poising-bars 26 and 27 arranged parallel with but spaced from each other in a horizontal plane.

For simplicity of this initial illustration, it will be assumed that the several drillings are to be performed on a common circle $k$, that is, at equal radial distances; and the various weight times radius (hereinafter sometimes abbreviated as "weight×radius" or "$W \times R$") effects will be considered as centered upon this same circle $k$ which may be regarded as the "unit-circle." Such a simplified procedure is frequently desirable with fine watch balance-wheels when the dimensions of a rim do not permit appreciable radial change of location for the drilling of holes or the addition of weights. It will be understood, however, that the unbalance is a state determined by the weight and the radial distance of the effective center of this weight from the center of rotation, and hence an unbalance may be properly defined as having a "weight×radius" value.

To secure commercially accurate operation of a balance-wheel such as 20 in a horological instrument, a measurable amount of unbalance is permissible, though it must be minute in amount. For purposes of convenience of description, this permissible amount of unbalance will be sometimes hereinafter referred to as a "unit of permissible unbalance," which is a value established by a weight acting at a radial distance. In this illustrated form, the distance is the radius of the unit-circle $k$, and the weight will correspondingly be taken as one unit.

As before noted, the unit of permissible unbalance is intended to connote an amount of unbalance such as will not cause unsatisfactory performance of the balance-wheel 20 or its equivalent oscillating or rotary member, and will, on occasion, be hereinafter referred to by the reference characters UOPU.

Before proceeding with a description of the balancing or poising of the balance-wheel 20, it may here be noted that rarely does a balance-wheel such as 20 possess, as manufactured, an error of more than 15 units of permissible unbalance, and more often far less. It will be understood, however, that the employment of the method is not limited to cases where the manufacturing error does not exceed fifteen times the permissible error, since by choice of relationships of know weight × radius values and of known angles, the unbalance of any device can be reduced, and it is contemplated within the frame of this invention that successive operations may be performed whereby, for example, a first stage of unbalance of say 225 UOPU may be reduced to one of about 15 UOPU, and in a second stage the unbalance of 15 UOPU may be reduced to 1 UOPU or less.

For purposes of description, however, it may be assumed that a given balance-wheel such as 20 forming a member of a lot or group of similar balance-wheels prior to being subjected to the following balancing or poising, does have 15 units of permissible unbalance centered on the unit-circle $k$ in what may be termed an "inherent mean heavy spot" represented in the accompanying drawings by the reference characters IMHS.

Now it may be assumed that the bearing-terminals 24 and 25 of the balance-staff 23 are respectively resting with almost frictionless engagement upon the upper surfaces of the poising-bars 26 and 27. Under these conditions, the inherent mean heavy spot IMHS will come to the lowermost position directly beneath the axis of the balance-wheel while the inherent mean light spot IMLS will be located diametrically opposite, as shown in Fig. 1.

The movement of the balance-wheel 20 as just above described will serve to definitely locate the inherent mean heavy spot IMHS as well as the inherent mean light spot IMLS, though for the present purposes IMHS will be mainly used as a reference point. It may here be noted, however, that IMHS may be located, if desired, by first locating IMLS and vice versa, since IMHS and IMLS are diametrically opposite each other.

Figure 1:
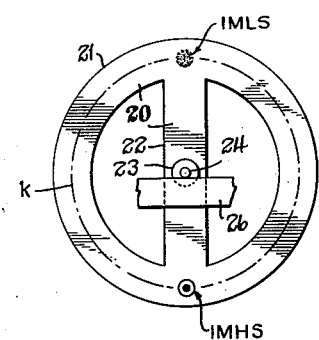
Fig. 1 is a schematic face view of a balance-wheel for a time instrument and showing the same mounted for gravity orientation and oriented to bring its inherent mean heavy spot directly below the axis of the balance-wheel, preparatory to being balanced in accordance with the present method.

Following the movement of the balance-wheel 20 into the position indicated in Fig. 1, a "balancing light spot" designated by the reference characters BLS is formed in the said balance-wheel on the unit-circle $k$ at a point (in the present illustrative instance) 82° 49' (angle $\theta$) displaced from the inherent mean heavy spot IMHS as is shown in Fig. 3. The formation of BLS results in the creation of a balancing heavy spot BHS of the same weight × radius value as BLS. BHS may be considered to be centered on the unit-circle $k$ at a point thereon diametrically opposite BLS, as is indicated in Figs. 3, 4 and 5. In the present illustrative instance, BHS is therefore displaced 97° 11' from IMHS.

The balancing light spot BLS may be formed by a drill or any other suitable cutting implement. The amount of material removed to produce the balancing light spot BLS will in a first illustration be taken as several times the maximum number of units of permissible unbalance which may be expected to be possessed by the balance-wheel 20 (and by any of the remainder of the lot or group) in its condition prior to being given the treatment now being described. In the present instance, BLS (and BHS) may be considered to have a weight × radius value of 60 units of permissible unbalance and to be formed on the unit-circle $k$.

The removal of material to produce the balancing light spot BLS (Fig. 3) will, as before noted, cause the appearance, in the balance-wheel 20 at a point on the unit-circle centered diametrically opposite BLS, of a balancing heavy spot BHS having a weight × radius value corresponding to the weight × radius value of the balancing light spot BLS, i. e., 60 UOPU.

The balancing heavy spot BHS and the inherent mean heavy spot IMHS may now be considered to combine to produce what may be termed a "resultant mean heavy spot" RMHS located intermediate BHS and IMHS as is indicated in Figs. 3 and 4. There will also be produced a "resultant mean light spot" RMLS at a location diametrically opposite RMHS and corresponding thereto in weight × radius value.

Now when the balance-wheel 20 as shown in Fig. 3, is relieved of restraint, it will turn and assume the position substantially as shown in Fig. 4, in which BHS has swung toward the lowermost point, while the relatively-lighter IMHS has swung upwardly into a position adjacent the horizontal. IMLS will, of course, also swing downwardly through the same angle as IMHS has swung upwardly. Ignoring slight frictional losses, the resultant mean heavy spot will now have located itself at the lowermost point (illustratively being the spot RMHS) on the unit-circle $k$ directly below the balance-staff 23.

The degree of movement of the balance-wheel between the position in which it is shown in Fig. 3 and the position in which it is shown in Fig. 4 will, of course, depend upon the amount of movement required to cause BHS to counterbalance the lighter IMHS and thus bring RMHS to the described lowermost position, though it is to be noted that IMHS has a greater lever-advantage than the heavier BHS when the balance-wheel reaches the position shown in Fig. 4.

Figure 9:
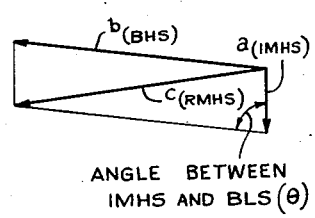
Fig. 9 is a diagrammatic view indicating some of the relationships of the factors involved in the present method.

If after the balance-wheel 20 has been brought into the condition in which it is shown in Fig. 3, RMHS is located in any suitable manner such, for instance, as by permitting it to reorient itself by gravity to the position of Fig. 4, RMHS will have a weight × radius value of 60 UOPU when IMHS has a weight × radius value of 15 UOPU and BHS has a weight × radius value of 60 UOPU as already referred to. That is, if a parallelogram is drawn as in Fig. 9, with one side $a$ equal to the weight × radius value of IMHS or 15 units, and another side $b$ equal to the weight × radius value of BHS or 60 units, and the angles 82° 49' and 97° 11' between its sides, the minor diagonal $c$ has a length of 60 units, which is the weight × radius value of the resultant RMHS. If now CLS is formed substantially coincident with RMHS and with a weight × radius value (60 UOPU), corresponding to the value assigned to BLS, the balance-wheel resulting, as here being considered and as illustrated in Fig. 5, will have perfect balance or poise. Other appropriate values for CLS will immediately suggest themselves once a parallelogram like Fig. 9 is laid out with the selected weight × radius value for BLS and the selected acute angle ($\theta$) between the latter and IMHS.

Let it now be assumed with respect to the showing of Figs. 3, 4 and 5 that the value of IMHS is 7.5 UOPU, while the values of BLS, BHS, CLS and CHS remain at 60 UOPU.

Under these circumstances, in the parallelogram having the same angles between the sides as before, and with side $b$ equal to 60 units as before but with side $a$ equal to 7.5 units, the minor diagonal or resultant RMHS will have a value of 59.53 UOPU. Now when CLS is formed coincident with RMHS and with a value, as before referred to, equal to BLS (60 UOPU), the remaining error in the balance-wheel 20 will be only 0.47 UOPU—well within the range of permissible degree of unbalance.

Now let a balance-wheel be considered which, previously to being subjected to the method indicated in Figs. 3, 4 and 5, is already in perfect balance. In such case, the diagram of Fig. 9 will still apply although the scalar value of IMHS is zero; that is, the balance-wheel will come to rest in some arbitrary position, and the position at which BLS is formed will be at the angle $\theta$ (82° 49′) from the vertical line downward from the balance axis which thus represents a direction for IMHS in Fig. 9. The parallelogram of forces will now be represented by the line b, with RMHS coincident with BHS.

Under the conditions just above referred to, BLS and hence BHS will have a value of 60 UOPU. When this balance-wheel is permitted to reorient itself into a position corresponding to Fig. 4, the only unbalance is that of BHS, and this will move to the bottom and now, in effect, becomes RMHS, with a weight × radius value of 60 units. When CLS is formed with a weight × radius value also of 60 UOPU at the site of RMHS indicated in Fig. 4, the balance-wheel will be restored to perfect balance or poise.

From the foregoing it will be apparent that the method carried out in the manner illustrated in Figs. 3, 4 and 5 produces remaining degrees of unbalance which are all within the permissible range, when the balance-wheel prior to being subjected to the described steps, has an unbalance somewhere between zero and 15 units, and delivers a perfectly corrected balance when the original error was either zero or fifteen units, with the stated values of the balancing and correcting spots of 60 UOPU each, and with the angle of the balancing light spot BLS from the vertical (that is, from IMHS) being 82° 49′.

It may also be pointed out that a balance-wheel having an original error of 16 or 17 UOPU, for instance, can be subjected to the identical treatment, wherewith the resultant RMHS has a weight × radius value less than 61 UOPU and hence a correcting light spot CLS of 60 units value will produce a balance-wheel within the permissible range. The same is true for any balance-wheel having up to about 20.8 units of original error, and, accordingly, for this illustrative example, the lot of balance-wheels having a maximum inherent unbalance of 20.8 units or less, constitutes a group which can be successively treated in the same way to produce from each a resultant product within the permissible maximum remaining unbalance. Further, balance-wheels having in excess of 20.8 UOPU will be greatly improved by the treatment, though not brought within the permissible range by a single treatment.

It is to be noted that since BLS and CLS are to have the same values, as above described, they both may be produced by the identical drill or other cutting-tool. Hence, should the drill or other cutting-tool inadvertently be employed for too long a period and as a consequence wear down from its intended size, there will be little change between two successive holes, so that the values of BLS and CLS will still remain the same relative to each other and no appreciable deviation from the effects above described will occur.

To secure essentially perfect poise in a balance-wheel when the two spots BLS and CLS have the same weight × radius value and IMHS equals either zero or the maximum expected value of unbalance, the cosine of the angle ($\theta$) between IMHS and BLS should essentially equal $$\frac{IMHS_{maximum}}{2BLS}$$

or its equivalent $$\frac{IMHS_{average}}{BLS}$$

In the showing of Figs. 1 to 5 inclusive, the various values were arbitrarily chosen for illustrative purposes, i. e., IMHS=15, 7.5 and zero UOPU; BLS=60 UOPU; and CLS=60 UOPU. With such a mode of procedure, the nature of the results (satisfactory or unsatisfactory) may be ascertained by laying out a parallelogram as previously explained or by the use of vector diagrams or mathematical formulas as more fully explained in the "Résumé."

Figure 6:
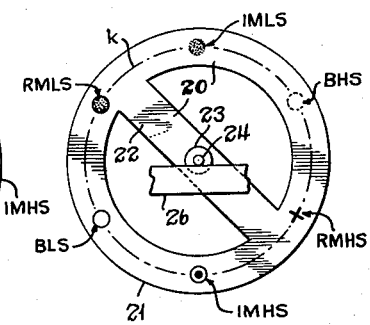
Fig. 6 is a view similar to Fig. 3 but illustrating a balance-wheel having a balancing light spot of a smaller value in its rim.
Figure 7:
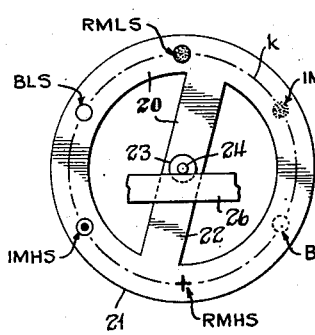
Fig. 7 is a view showing the balance-wheel of Fig. 6 after the provision thereon of a balancing light spot and after reorientation of the balance-wheel.
Figure 8:
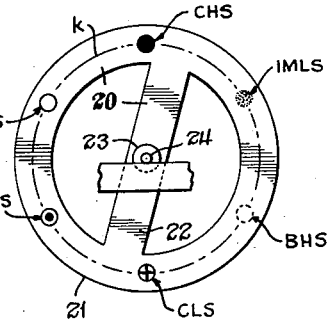
Fig. 8 is a view similar to Fig. 7, but showing the reorientation of the balance-wheel and the cutting therein of a correcting light spot substantially at the site of the resultant mean heavy spot.

*The method as illustrated in Figs. 6, 7 and 8*

It is now proposed to consider a set of circumstances wherein each of a lot of balance-wheels such as 20 is provided with a correcting light spot having a weight × radius value slightly less than the similar value of the balancing light spot.

For this illustration, the maximum initial error or IMHS occurring in any member of the lot may be considered to be 15 UOPU as before. The weight × radius effects may again be considered as being present at or established at the unit-circle $k$. The balancing light spot BLS will be selected for a weight × radius value of 15 UOPU rather than the 60 UOPU previously referred to. Applying the formula just above, the cosine of the angle between IMHS and BLS equals 15÷(2×15) or 0.50 and hence angle $\theta$ equals 60°.

The particular balance-wheel having an actual IMHS of 15 UOPU may be allowed to turn itself on the poising-bars, so that IMHS is at the bottom and BLS with a weight × radius value also of 15 UOPU will be drilled at an angle of 60° from IMHS as indicated in Figs. 6, 7 and 8. The formation of BLS will result in BHS also having a value of 15 UOPU and of the appearance between BHS and IMHS, of the resultant mean heavy spot RMHS also with a value of 15 UOPU. This RMHS value may be conveniently ascertained by laying out a parallelogram similar to Fig. 9 but with appropriately altered values, or by formula or vector diagrams to be later explained in the "Résumé."

When released from restraint and permitted to orient itself by gravity, the balance-wheel as shown in Fig. 6 will turn to bring RMHS down to the intersection of the vertical center line with the unit-circle $k$ as shown in Fig. 7. Now if CLS is produced upon the site of RMHS as indicated in Fig. 8 (or upon a radial line substantially coincident therewith) and with a weight × radius value of 14 UOPU, the remaining unbalance in the balance-wheel will amount to 1 UOPU. Thus, the balance-wheel at the completion of the operation shown in Fig. 8 will be one suitable for use under the standards previously set.

Now with the angular relationship of 60° remaining the same as above described, let it be assumed that in another member of the lot of balance-wheels, IMHS has a value of only 7.5 UOPU while the value of BLS (and hence BHS) remains at 15 UOPU and CLS remains at 14 UOPU.

Under these conditions and after BLS has been formed, RMHS will have a weight × radius value of almost exactly 13 UOPU (as may be determined in a manner above referred to), and will, of course, be located further away from IMHS than was the case previously. Now when CLS with a value of 14 UOPU is cut on the site of RMHS (or on a radial line substantially intersecting it), the remaining degree of unbalance will be 1 UOPU, represented by the difference between RMHS (13 UOPU) and CLS (14 UOPU).

When a balance-wheel of the lot has an IMHS value of zero, the formation of a BLS of 15 UOPU will create a BHS also with a value of 15 UOPU. Now when CLS with a value of 14 UOPU is formed on a radial line substantially coincident with the site of BHS (diametrically opposite BLS), the now-remaining unbalance will amout to but 1 UOPU.

In this form of practice, balance-wheels having original unbalances (IMHS) of about 2.3 and about 12.7 weight × radius values each, will, upon treatment, have a resultant mean heavy spot (RMHS) effect of exactly 14 units, so that when formed with CLS of 14 units, these balance-wheels will be made essentially perfect by the treatment referred to.

Again each member of the chosen lot of similar members may be subjected to the identical poising or balancing treatment and satisfactory balancing accomplished.

For modes of determining various values, reference may be had to the Résumé.

*The method as illustrated in Figs. 10 to 14 inclusive*

Inasmuch as the balance-wheels 20 before described herein are relatively thin, the static balancing thereof as before described will also serve to effectively dynamically balance the same in the event that it is desired to employ a structure like the balance-wheels 20 as a high-speed rotating member. Thus, the relatively-narrow flywheels commonly employed in automobile engines and the like may have imparted to them satisfactory dynamic balance by practicing the same method for eliminating or reducing to a minimum the components of the dynamic unbalance.

In instances, however, where it is desired to dynamically balance a member having appreciable dimensions in the direction of the axis of rotation, it is advisable to employ the method of balancing of the present invention in a manner as will presently appear.

For purposes of illustrating one mode of dynamically balancing a member in accordance with the method of the present invention, let it be assumed that a lot of members 29 such as is shown in Figs. 10 to 14 inclusive, is of such character that the maximum units of permissible unbalance which may reasonably be expected to appear in any one of the lot of such members as manufactured or partially pre-balanced, would amount to 25 UOPU. As shown, the member 29 is provided at its opposite ends respectively with stub-shafts 30 and 31 about the common axis of which the member may turn.

Let it further be assumed that the selected member 29 now to be balanced actually has 24 UOPU with its effect centered about a location one-third the distance from the left end of the member as shown in Fig. 10, and hence two-thirds of the distance from the right end of the member. It is to be further assumed that the effect of the said 24 UOPU is centered on the unit-circle $k$ about the indications IMHS respectively appearing in Figs. 10, 11, 12, 13 and 14.

Due to the fact, however, that IMHS as indicated in Fig. 10 is twice as close to the left end of the member as it is to the right end thereof, the effect of the 24 UOPU may be said to appear as components in the two end-planes of the member; the component at the left end-plane of the member, as indicated in Figs. 11 and 12, will have a value of but 16 UOPU at the point shown, and for similar reasons the corresponding component of the IMHS located as in Fig. 10, may be said to appear at the right end-plane of the member, as indicated in Fig. 13, with a value of but 8 UOPU and at the position shown.

The components of IMHS may be located at both ends of the member 29 by means of any well-known apparatus now available, without, however, requiring the ascertainment of the actual value of IMHS for each individual member of the lot of similar members like 29. Such known apparatus may fix the location of the components of the dynamic unbalance at both ends of a rotating body from records of the vibrations of the latter, for instance.

Now let it be assumed that BLS is formed in the left end of the member 29 (Fig. 11) with a pre-selected weight × radius value of 75 UOPU, to thus create BHS at a diametrically-opposite point and having a similar value. Under the circumstances now being considered, BLS as indicated in Fig. 11, is to be located approximately 82° from IMHS, thus locating BHS about 98° on the other side of IMHS.

Also under the circumstances above described and after the formation of BLS and BHS in the left end of the member 29, RMHS will have a weight × radius value of 74.4 UOPU and will appear intermediate BHS and IMHS at a point about 85° 40′ from the latter.

If now, at the site of RMHS (or substantially on a radial line coincident therewith) as appearing in Fig. 11, CLS is cut (Fig. 12) with a weight × radius value of 75 UOPU, the remaining unbalance in the left end of the member 29 will amount to but about 0.6 UOPU. With the left end of the member 29 thus statically balanced, the latter is, of course, still dynamically unbalanced when rotated with its stub-shafts 30 and 31 in suitable journal-bearings (not shown), because the right end of the member 29 is, by virtue of the component inherent maximum heavy spot thereat, neither statically nor dynamically balanced.

Now let the right end of the member 29 be considered.

BLS may be formed as indicated in Figs. 13 and 14 also with a weight × radius value of 75 UOPU and at approximately 82° from IMHS, which will result in the formation of BHS also with a value of 75 UOPU. Under these circumstances, RMHS in the right end of the member 29 will now appear at a point about 91° 55′ displaced from IMHS and will have a weight × radius value of about 74.3 UOPU as compared to the adjacent IMHS having only 8 UOPU.

Now when RMHS (74.3 UOPU) as indicated in Fig. 13 is overcome by the formation of CLS with a value of 75 UOPU and as indicated in Fig. 14, the remaining unbalance in the right portion of the member 29 will amount to but 0.7 UOPU. The entire member 29 is now dynamically balanced to all practical intents and purposes.

All other members of the lot similar to the member 29 may be treated in identical manner to thus bring them into a condition wherein the remaining unbalance considered as effective at the respective end-planes of a member, is 1 UOPU or less.

The various values set forth above for illustrative purposes may be ascertained or chosen in a variety of manners, such, for instance, as is set forth in the Résumé.

*The method as illustrated in Fig. 15*

In the foregoing, the several light and heavy spots, their mass effects and the cuttings performed, have been regarded as geometrical points located on the same unit-circle. Under some circumstances, this is good engineering practice since, for example, the mass of material removed from a cylindrical drill-hole can readily be summarized as exerting its effect at the axis of the hole. It will also be understood that the mass effects of both light and heavy spots are weight × radius values and can be represented with full equivalence by a greater mass-change nearer the axis or fulcrum, or by a lesser mass-change farther from the axis or fulcrum, as long as the weight × radius value remains the same.

Thus, and by way of example, the particular mode of carrying out the invention illustrated in and described in connection with Figs. 6, 7 and 8 may here be first considered.

In the instance now being discussed, the balancing light spot was given a value of 15 UOPU, whereas the correcting light spot was given a value of 14 UOPU. This relationship was effected by locating both BLS and CLS on the same unit-circle $k$ and by making the removal of material at CLS $^{14}/_{15}$ of the amount removed at BLS. Now should it be desired to remove the same amount of material at both BLS and CLS, this may be effected by making the radius at which CLS is located but $^{14}/_{15}$ of the radius of the unit-circle $k$, as is indicated in Fig. 15. However, under these conditions and with CLS having a greater mass-effect than previously described, its weight × radius value will remain the same as it was with the values given in connection with the discussion of Figs. 6, 7 and 8.

Thus, it is sometimes advantageous to employ the same drill to form both BLS and CLS as, for instance, by drilling through the same thickness of homogeneous material or drilling to identical depths into such material even though the circumstances should require that BLS and CLS have different weight × radius values respectively.

It will be obvious from the foregoing (and as specifically hereinafter demonstrated) that instead of cutting material from the balance-wheels or other oscillating or rotating members, in order to provide balancing light spots or correcting light spots, material may be added to such members to provide balancing heavy spots or correcting heavy spots and thus, in turn, respectively provide the desired balancing light spot effects and correcting light spot effects.

BALANCING BY ADDING MATERIAL

*The method as illustrated in Figs 16 to 34 inclusive*

For purposes of description, it may be assumed that the maximum unbalance present in the lot of members is 20 UOPU and that such maximum unbalance is present in the particular member to be presently described.

It may be further assumed that the bearing-terminals 24 and 25 of the balance-staff 23 are respectively resting with almost frictionless engagement, upon the upper surfaces of the poising-bars 26 and 27, as is indicated especially well in Fig. 20. Under these conditions and when utilizing gravity orientation, the inherent mean heavy spot IMHS will come to the lowermost position, while the inherent mean light spot IMLS will be located diametrically opposite, as shown in Fig. 16.

The movement of the balance-wheel 20 as just above described will serve to definitely locate the inherent mean light spot IMLS as well as the inherent mean heavy spot IMHS, though for purposes of description, IMLS will again be mostly used as a reference point.

Following the completion of the movement of the balance-wheel 20 into the position indicated in Fig. 16, the balance-wheel 20 is provided with a balancing heavy spot BHS at an obtuse angle with respect to IMHS so that the resultant BLS will be located at an acute angle with respect to IMHS, as is shown in Fig. 17. For purposes of description, let it be assumed that the angular distance between BLS and IMHS is about 67° 20'. This angular distance or any other acute angular distance, may be selected in a manner made more fully apparent in the Résumé hereof.

The balancing heavy spot BHS may be formed by spot-welding, soldering, cementing or otherwise securing to the balance-wheel 20 or other desired member a piece of material to provide an increment of mass having the desired weight-value and at a radius such that the desired weight × radius value is produced. A drop of solder or the like may also be used. For present purposes, both BLS and BHS may each be considered to have a weight × radius value of 26 units of permissible unbalance.

Now when the balance-wheel 20 as shown in Fig. 17 is relieved of restraint, it will turn and assume the position substantially as shown in Fig. 18, in which BHS has swung toward the lowermost point, while the relatively-lighter IMHS has swung upwardly into a position adjacent the horizontal. IMLS will, of course, also swing downwardly to the same degree that IMHS has swung upwardly.

The degree of movement of the balance-wheel between the position in which it is shown in Fig. 17 and the position in which it is shown in Fig. 18 will, of course, depend upon the amount of movement required to cause BHS to counterbalance the lighter IMHS.

The position which the balance-wheel 20 will now assume (Fig. 18) will (ignoring slight frictional losses) result in the resultant mean heavy spot RMHS and the resultant mean light spot RMLS respectively locating themselves at the lower and upper portions of the rim 21 on the vertical center line.

The respective values (weight × radius) of both RMHS and RMLS under the conditions just above referred to will be about 26 UOPU and may be ascertained by means of a parallelogram such as is shown in Fig. 9 or by formula or vector diagrams referred to in the Résumé hereof.

To perfectly poise the balance-wheel 20 after it is in the condition shown in Fig. 18, about 26 UOPU should be added. But inasmuch as other values for IMHS must also be taken into account in other balance-wheels of a lot like 20 and which are being considered by way of example only, it is preferred to add a slightly less weight × radius value at RMLS or on a common radial line therewith, than the aforesaid 26 UOPU. Therefore, the value 25 UOPU may be considered as appropriate.

At the location RMLS (or substantially on a radial line coincident therewith), the desired amount of material may be added in any suitable manner to the member to provide a correcting heavy spot CHS indicated in Fig. 19 and having the desired weight × radius value of 25 UOPU.

The particular balance-wheel above described will now have a degree of remaining unbalance amounting to about 1 UOPU.

For purposes of further making clear the results produced by the above-described mode of carrying out the present invention, it is now proposed to describe the effects upon a balance-wheel (also forming a member of the lot above referred to) having its inherent mean heavy spot valued at only 12 UOPU, rather than the 20 UOPU considered previously. Reference may now be had to Figs. 21 and 22.

With IMHS and IMLS each having a value of 12 UOPU, the same procedure may be followed as that previously described, namely, IMHS may be brought to a given location by gravity or otherwise, such as the position shown in Fig. 16. Following this, the balancing heavy spot BHS may be added having the before-mentioned value of 26 UOPU, thus creating a balancing light spot BLS also having the value of 26 UOPU at the same 67° 20′ acute angle from IMHS. The balance-wheel may now be reoriented into the position shown in Fig. 21.

Now, however, since IMHS is only 0.6 as heavy as the 20 UOPU previously described, IMHS will rise closer to the horizontal than is the case in Figs. 18 and 19, while relatively-heavier BHS will move closer to the vertical center line, all as illustrated in Figs. 21 and 22, and hence closer to the resultant mean heavy spot RMHS. Under these circumstances, RMHS and RMLS will each have a value of about 24.08 UOPU.

Now, by adding a correcting heavy spot CHS (Fig. 22) still having the previously employed value (weight × radius) of 25 UOPU, at the location RMLS (or on a radial line substantially coincident therewith), the remaining degree of unbalance will be reduced to about only 0.92 UOPU.

Having demonstrated the amount of remaining unbalance in situations where IMHS has a selected maximum value of 20 UOPU and also where IMHS is only 0.6 of the said maximum value of IMHS, namely, 12 UOPU, it is now proposed to demonstrate the effects of the above-described mode of carrying out the present invention in instances where a balance-wheel 20 is in perfect balance or poise (as initially manufactured or as partially pre-poised) before being subjected to the foregoing steps. Reference may now be had to Figs. 23 and 24.

When an already perfectly-balanced balance-wheel such as 20 is placed upon the poising-bars 26 and 27, it will, of course, not turn, since it has no inherent mean heavy spot such as IMHS of the preceding figures. With any desirable suitable apparatus, a balancing heavy spot BHS having the value of 26 UOPU may be added (Fig. 23), thus producing a balancing light spot BLS also having a value of 26 UOPU.

Now when the balance-wheel is relieved of restraint, it will assume a position substantially as shown in Fig. 24, in which the balancing heavy spot BHS has swung downwardly and located itself directly on the vertical center line, thus bringing the balancing light spot BLS also on the vertical center line but above and diametrically opposite BHS.

After the balance-wheel has shifted into the position shown in Fig. 24, a so-called correcting heavy spot CHS may be added (still at the previously used value of 25 UOPU) at the site of BLS (or on a radial line substantially coincident with BLS), whereupon BLS becomes CHS and BHS becomes CLS, as may be seen by comparing Figs. 23 and 24.

Obviously, the balance-wheel when treated to the stage illustrated in Fig. 24, will have a degree of unbalance equal to the difference between the value of BHS (26 UOPU) and the value of CHS (25 UOPU), namely, 1 UOPU. While this originally perfectly-balanced balance-wheel did not, in fact, require treatment by the present method, nevertheless it will be noted that as treated (along with the rest of the lot of which it formed a part), its remaining unbalance will not exceed the unit of permissible unbalance.

It may here be noted that for all values of IMHS from and including zero and maximum (under the particular conditions here being considered), the remaining unbalance would not exceed 1 UOPU in any member of the lot.

It may be further noted that in instances where balance-wheels such as 20 have inherent mean heavy spots with values of either 3 UOPU or 17 UOPU, the result of the above-described specific mode of carrying out the present invention, will be to produce balance-wheels having substantially zero remaining unbalance.

BALANCING BY ADDING AND THEN REMOVING MATERIAL

*The method as illustrated in Figs. 25 to 29 inclusive*

In addition to demonstrating a mode of carrying out the present invention by first adding material to and then removing material from each member of a lot, it is now also proposed to consider the balancing of a lot of members in which IMHS varies not between zero and a predetermined maximum, but between some value well above zero and the said predetermined maximum.

Under some circumstances, it is found that slight eccentricity is present in each member of a lot of members, thus assuring that each and every member of the lot will have appreciable inherent unbalance. For purposes of illustration only, it may be assumed that the said lot of members, when considered as a whole, exhibits a minimum IMHS of 7 UOPU and a maximum IMHS of 27 UOPU. Thus, the mean inherent unbalance of the members of the lot will be about 17 UOPU.

Let it now be assumed that the particular member of the said lot now to be considered has an IMHS of 17 UOPU and is resting upon the upper surfaces of the poising-bars 26 and 27. Under these conditions, the inherent mean heavy spot IMHS will come to the lowermost position when the member is freed of restraint, while the inherent mean light spot IMLS will be located diametrically opposite, as shown in Fig. 25.

As previously indicated herein, the movement of a balance-wheel such as the balance-wheel 20 in the manner just above described, will serve to definitely locate the inherent mean heavy spot IMHS as well as the inherent mean light spot IMLS.

Following the orientation of the balance-wheel 20 into the position indicated in Fig. 25, let it be assumed, for purposes of example only, that a balancing heavy spot BHS of 29.4 UOPU is added to the balance-wheel 20 at a point 125° 20′ displaced from the inherent mean heavy spot IMHS as is shown in Fig. 26, thus locating BLS (also 29.4 UOPU) at an acute angle of 54° 40′ from IMHS.

Now when the balance-wheel 20 as shown in Fig. 26 is relieved of restraint, it will turn and assume substantially the position as shown in Fig. 27, in which BHS has swung toward the lowermost point, while the relatively-lighter IMHS has swung upwardly into a position adjacent the horizontal. IMLS will, of course, also swing downwardly to the same degree as IMHS has swung upwardly.

The angular movement of the balance-wheel between the position in which it is shown in Fig. 26 and the position in which it is shown in Fig. 27 will, of course, depend upon the amount of movement required to cause BHS to counterbalance IMHS.

RMHS will now have located itself at the lower portion and RMLS will locate itself at the upper portion of the rim 21 on the vertical center line, as is indicated in Fig. 27.

The values of both RMHS and RMLS, under the conditions just above referred to, will be about 24 UOPU. RMLS will, of course, be located diametrically opposite RMHS.

To perfectly poise the balance-wheel 20 after it is in the condition shown in Fig. 27, 24 UOPU should be removed. But, as before explained, inasmuch as other values for IMHS (7 to 27 UOPU inclusive) must also be taken into account in other balance-wheels of a lot like 20, under the present specific circumstances it is preferred to remove slightly more material at the location RMHS than the aforesaid 24 UOPU. Therefore, the value 25 UOPU may be considered as appropriate for removal from the location RMHS of Fig. 27.

At the location RMHS of Fig. 27 (or substantially on a radial line coincident therewith), the desired amount of material may be removed by drilling or otherwise cutting the balance-wheel to provide a correcting light spot CLS indicated in Fig. 28 and having the desired weight × radius value of 25 UOPU and, in turn, producing a CHS of corresponding value (25 UOPU).

The particular balance-wheel considered above will now have a remaining unbalance of about 1 UOPU.

There now may be considered the relationships wherein the particular member of the lot being balanced has an inherent mean heavy spot valued at only 7 UOPU rather than the previously-referred to 17 UOPU.

With IMHS and IMLS each having corresponding values of 7 UOPU, the same procedure may be followed as that previously described, namely, IMHS is located, following which a balancing heavy spot BHS may be added having the beforementioned value of 29.4 UOPU and at the same previously-chosen angle of 125° 20′ from IMHS. The addition of weight as described to produce BHS automatically creates a balancing light spot BLS also having the value of 29.4 UOPU and located at the same 54° 40′ acute angle from IMHS.

Now here, again, since IMHS is only $7/17$ as heavy as the 17 UOPU previously described, IMHS will move further away from its lowermost position than was the case previously, while the relatively-heavier BHS will move closer to the vertical center line of the wheel when gravity re-poising is employed. Under these circumstances, RMHS and RMLS will each have values of about 26 UOPU.

Now, by removing material to produce a correcting light spot CLS still having the previously-employed value (weight × radius) of 25 UOPU at the site of RMHS (or on a radial line substantially coincident therewith), the remaining degree of unbalance will be reduced to about 1 UOPU or substantially the same value as described in connection with the balancing of a member having an IMHS of 17 UOPU.

The next condition which may be considered is where a given member of the lot above referred to has an IMHS of 27 UOPU. The sequential formation in such a member of a balancing heavy spot BHS (and BLS) of 29.4 UOPU and a subsequent CLS of 25 UOPU will result in the member in question having a remaining unbalance of 1 UOPU. In this latter case, the remaining unbalance will be the difference between the said RMHS of 26 and the said CLS of 25, namely, a remaining unbalance of about 1 UOPU.

In instances where a given member of the lot above considered has an IMHS value falling intermediate either 7 UOPU and 17 UOPU, as well as falling between the said 17 UOPU and the said 27 UOPU, the remaining unbalance in such a member will always be less than 1 UOPU and will, in fact, be zero when IMHS is either 10 UOPU or 24 UOPU.

In the vector diagram of Fig. 37, the relationships above referred to are clearly shown, though it is to be again borne in mind that the particular acute angle between IMHS and BLS as described for purposes of illustration, may be changed to conform and cooperate with other desired selections of original and final conditions of unbalance and values of the balancing spots and correcting spots, as will be further apparent from the Résumé hereof.

BALANCING BY REMOVING AND THEN ADDING MATERIAL

*The method as illustrated in Figs. 31 to 34 inclusive*

It is now proposed to describe one mode of carrying out the present invention wherein a group of similar members may be brought to the desired degree of balance by first removing weight from each of the similar members and subsequently adding weight thereto.

For purposes of illustration and to further show the diverse applications of the present invention, a set of circumstances will be presumed wherein the selected group of members to be balanced exhibit a minimum IMHS of 25 UOPU and a maximum IMHS of 45 UOPU, with a mean inherent unbalance of the lot being about 35 UOPU.

A lot of members of the character just above described might be encountered in connection with the production of rotor-members for synchronous electric clock motors and in which (as shown in Figs. 30 to 34 inclusive), the members 28 are each provided on their peripheries with pole-salients 29. Such pole-salients very often vary in their width in a circumferential direction as well as in their circumferential spacings, with the result that a lot of rotor-members such as 28 may exhibit, in common with each other, an unbalance which has its minimum quite far removed above zero. Such a lot of rotor-members may, for instance, have IMHS values as before stated from and including about 25 UOPU to and including about 45 UOPU.

In the instance shown, the disk-like rotor-member 28 has a shaft 30 which may be rested at its respective opposite reduced ends upon the poising bars 26 and 27 so that each member of the lot may be permitted to turn by gravity to initially locate its inherent mean heavy spot and its inherent mean light spot.

Let it be assumed that a particular member of a lot of rotor-members 28 above referred to has an inherent mean heavy spot of a value of 35 UOPU. Now, when this rotor-member is permitted to freely turn on the poising-bars 26 and 27, its IMHS will move to the lowermost position directly vertically below the center line axis with IMLS located on a line diametrically opposite.

Following the orientation of the rotor-member 28 as just above described into the position indicated in Fig. 30, it may be assumed (for purposes of example only), that a balancing light spots BLS is drilled or otherwise cut in the said rotor-member 28 at an angular distance of 34° 18' from IMHS and having a weight × radius value of about 42.4 UOPU. As shown, both BLS and BHS are located on the unit-circle $k$. The re-resultant balancing heavy spot BHS may be considered to be located on the same diametrical line as the said BLS, as indicated in Fig. 31, and will, of course, have the same weight × radius value, namely, about 42.4 UOPU.

Now when the rotor-member 28 is again relieved of restraint, it will turn and assume substantially the position shown in Fig. 32 in which RMHS has swung downwardly. As has been previously explained, the degree of movement of the rotor-member 28 between the position in which it is shown in Fig. 31 and the position in which it is shown in Fig. 32 will, of course, depend upon the amount of movement required to cause BHS to counterbalance IMHS.

The values of RMHS and RMLS under the conditions just above referred to, will be about 24 UOPU.

To perfectly poise the rotor-member 28 after it is in the condition shown in Fig. 32, there should be provided therein a correcting light spot and a correcting heavy spot each having equal weight × radius value of about 24 UOPU. Here, again, however, other values for IMHS must also be taken into account in other members of the lot or rotor-members like 28, and under the present specific circumstances, it is preferred to provide the member with correcting light spots and correcting heavy spots each having a value of 25 UOPU.

At a location substantially on a radial line passing through RMLS, there may be added by brazing, soldering or otherwise, a mass having a total weight × radius value of 25 UOPU thereby, in turn, creating a correcting light spot CLS effect of equal value and 180° removed from CHS, as is indicated in Fig. 33.

Instead of adding BHS on the unit-circle $k$, the same is shown as located on a smaller unit-circle $m$ of one-half the radius of $k$. Under these circumstances, CHS will have twice the weight which would be required if it were located on $k$, to thus provide the desired weight × radius value.

For further purposes of illustration, it may now be assumed that another member of the lot of rotor-members like 28 exhibits an inherent mean heavy spot of 25 UOPU rather than the 35 UOPU considered just previously.

With IMHS and IMLS each having a value of 25 UOPU, the same procedure may be followed as just previously described, namely, IMHS may be brought into a given location by gravity or otherwise as is indicated in Fig. 30. Following this, material may be removed to directly provide the desired balancing light spot having the before-mentioned value of 42.4 UOPU at the same angle of 34° 18' from IMHS and thus also creating a balancing heavy spot BHS also having the same value as BLS.

The rotor-member 28 may now be reoriented into the position indicated in Fig. 33.

It may here be noted that since IMHS under the present example is only 5/7 as heavy as the 35 UOPU previously referred to, the degree of movement of the rotor in reorienting itself will be less than previously described and hence BHS will be closer to RMHS. Under these conditions, both RMHS and RMLS will each have a value of about 26 UOPU.

Now by adding material to provide a correcting heavy spot CHS (Fig. 33), still having the previously-employed weight × radius value of 25 UOPU, the remaining unbalance will be about 1 UOPU. As previously, CLS will be located substantially on a radial line leading through RMHS.

There now may be considered the situation wherein the particular member of a lot of rotors being balanced has an inherent mean heavy spot valued at 45 UOPU. Under these conditions, the sequential direct formation in the rotor of a balancing light spot of 42.4 UOPU and the subsequent addition of a correcting heavy spot of 25 UOPU, will result in the particular member having a remaining unbalance also of 1 UOPU. In this instance, the remaining unbalance will be the difference between the respective values of RMHS (26) and CLS (25).

In such instances where a given member of the lot of rotor-members above considered, has an IMHS falling intermediate either 25 UOPU and 35 UOPU, as well as falling between the said 35 UOPU and the said 45 UOPU, the remaining unbalance in such members will be always less than 1 UOPU and will, in fact, be zero when IMHS is either 28 UOPU or 42 UOPU.

The vector diagram of Fig. 37 shows the relationships above referred to, though here again it must be borne in mind that the particular acute angle between IMHS and BLS is described for purposes of illustration, as will be further apparent from the Résumé hereof.

RÉSUMÉ

Assuming that the maximum initial unbalance present in any member of a selected group or lot of similar oscillating or rotating members (as originally manufactured or as partially corrected for unbalance) is known and the maximum permissible remaining unbalance is decided upon, the method of the present invention may be explained as follows:

(1) With respect to each member of the lot of similar members, a known unbalance (BLS or BHS) is provided so as to produce a light spot effect at an acute angle (from about 20° to about 85°) with respect to the unknown initial unbalance (IMHS) which may range between zero and the predetermined maximum amount, so that the resultant (RMHS of RMLS) of the two unbalances will be such as to correspond (within 1 UOPU) in value to the mean value of all of the RMHS values of the lot and hence all of the latter values will be substantially alike; and (2) With the resultants for all members of the lot being alike as above, a fixed or known correction (CLS or CHS) corresponding in value (within 1 UOPU) to both the maximum and minimum of the said resultants, is then made in each member of the said lot to thus leave little or no remaining unbalance.

According to this invention, each member of a group or lot of similar members having an unknown unbalance IMHS (which does not exceed a predetermined maximum) has a known unbalance (BLS) effect produced therein at a predetermined acute angle from IMHS whereby a resultant mean unbalance (RMHS or RMLS) is produced. By the original selection of the said angle and of the added known unbalance (constant for all members of the said lot) in relation to the known range of manufacturing or other pre-processing error in the group of members (IMHS from zero to a selected known maximum) and the permissive operational tolerance (UOPU), this RMHS becomes substantially the same (within the permissive tolerance) for all the members of the lot. Hence, the correction by a known amount (e. g., by drilling the correcting spot of known weight at a known radius), will bring each member of the group finally within the permissible limit of remaining unbalance. The weight × radius value of the balancing spot need not be large compared to the weight × radius value of IMHS maximum and at least two different values of IMHS will provide the same resultant so that substantially absolute correction is provided for at least two values of IMHS, as well as greatly reduced remaining unbalances in members of the lot having intermediate values of IMHS.

It will be clear that in carrying out the present invention, the removal of material to produce a visually-evident balancing light spot BLS, inevitably results in the creation of a balancing heavy spot effect BHS of equal weight × radius value. Such BHS may be considered to be centered on the opposite side of the center of the member from BLS and on a diametrical line extending through both the said center and BLS. Similarly, by adding weight to provide a visually-evident balancing heavy spot BHS, there is automatically produced a balancing light spot effect BLS of corresponding weight × radius value. Each BLS may be considered to be centered on the opposite side of the center of the member from BHS and on a diametrical line extending through both the said center and BHS. The same effects occur in connection with the creation of CHS and CLS.

*General formula*

The general formula for the resultant unbalance from the combined effects of any inherent mean unbalance spot (IMHS or IMLS) and any balancing spot (BHS or BLS) is substantially:

Resultant =

$$\sqrt{\begin{pmatrix} IMHS^2 \\ \text{or} \\ IMLS^2 \end{pmatrix} + \begin{pmatrix} BHS^2 \\ \text{or} \\ BLS^2 \end{pmatrix} - 2\begin{pmatrix} IMHS \\ \text{or} \\ IMLS \end{pmatrix}\begin{pmatrix} BHS \\ \text{or} \\ BLS \end{pmatrix} \cos\theta}$$

where $\theta$ is the angle between IMHS and the effective balancing light spot BLS, and where IMHS and both BLS and BHS are respective weight × radius values. In general, if the balancing light spot BLS is located at more than 90° from the inherent mean heavy spot IMHS, then its effect adds to the inherent unbalanced lightness of the members, inasmuch as for angles from 90° to 180° inclusive $\cos\theta$ becomes negative. If BLS is located at exactly 90° from IMHS, then it has no vertical vectorial component which adds to or subtracts from the inherent unbalance, since the $\cos\theta$ of 90° is always zero, as will be obvious from the vectorial relations.

From the foregoing it will be clearly apparent that the locating of BLS at any angle intermediate of and including the angles 90° and 180°, will provide a resultant mean heavy spot which in all cases will be greater than the inherent mean heavy spot, and furthermore, this RMHS, for all values of IMHS other than zero, will also be greater than the balancing light spot. It is further to be noted that should any of the angles just referred to be utilized in the manner described, the resultant mean heavy spot will always increase in value as the value of IMHS increases and, in fact, RMHS will not have identical values for two different values of IMHS as will be the case under the present invention.

In accordance with the present invention, the more the angle between BLS and IMHS is reduced below 90°, the greater is the vertical vectorial component thereof, which serves to counteract IMHS, but on the other hand, as this angle is reduced, the vectorial component thereof at a right angle to the vertical line through IMHS will decrease and as the said angle approaches zero, this component will produce a resultant mean heavy spot vector having too great a range to be readily compensated for by a CLS value which is standard for a lot of members. Hence, the optimum angle $\theta$ depends upon the weight × radius value of the maximum inherent heavy spot, upon the weight × radius value of the change produced by BLS, upon the weight × radius value of the correcting spot, and upon the permissible unit of unbalance.

By locating BLS at an acute angle ($\theta$) from IMHS in accordance with the present invention, BLS always supplies a vertical vectorial component which subtracts from the IMHS maximum vector. Furthermore, RMHS will have identical values for at least two different values of IMHS, all as has been previously described and as will be clearly apparent by reference to Figs. 35, 36 and 37.

The method of the present invention may be further explained by means of vector diagrams such, for instance, as those shown in Figs. 35, 36 and 37, which are respectively laid out to fit different sets of specific circumstances, for illustrative purposes.

For example, where it is desirable to add or remove the least amount of material to effect a given accuracy of balancing, the correcting spots preferably should be less than the balancing spots. Fig. 35 shows the vectorial relations to provide optimum conditions when the correcting spot is less than the balancing spot, although good results can also be obtained (as is also indicated) under the particular conditions wherein the balancing spots and correcting spots are alike.

Under conditions wherein it may be desirable to provide balancing spots and correcting spots of substantially equal weight × radius values (which under some conditions afford advantages), Fig. 36 shows the basic vectorial relations to provide optimum results.

Another factor in considering either of the above conditions is whether or not the IMHS of individual members of a lot varies from zero to IMHS maximum or from some value above zero to IMHS maximum. This latter condition is often encountered in production where a major unbalance effect is present in all of the members of a lot. For example, an eccentric punch forming part of the blanking-tools for the production of balance-wheels or rotor-members, would cause some unbalance to occur in all members of a lot. Under this circumstance, optimum conditions are obtained by taking this factor into consideration as will be more fully hereinafter explained. Fig. 37 shows the vectorial relations when the IMHS minimum of a lot does not vary down to zero but rather only down to a value well above zero.

The foregoing explanations show optimum values from which anyone skilled in the art can select conditions that deviate from those shown, but which will still provide excellent and satisfactory results.

It may again be noted that the values referred to are those represented by products of weight and the radial distances thereof. Such "weight × radius value" will be the same whether produced by a small mass at a large radial distance or a larger mass at a smaller radial distance.

*The showing of Fig. 35*

Attention may first be called to the fact that the vector diagram of Fig. 35 is constructed primarily to fit conditions wherein it is desired to remove or add a minimum amount of material in order to secure satisfactory balancing in the lot of members, and is particularly pertinent to the showing and description of Figs. 6, 7 and 8.

The trigonometric and vectorial relation can be seen from Fig. 35, where IMHS is designated by a heavy vector line downward from the axis O. A balancing light spot BLS is shown as a vector lying on a line at an angle $\theta$ from the vector of IMHS, which spot will have its complement in a balancing heavy spot of equal weight × radius value represented by the heavy vector lines BHS located 180° from the BLS vector. The scalar lengths of these vectors can be fixed by the weight × radius value of the respective unbalances IMHS and BLS. To obtain the resultant of these two vectors, a vertical dotted line is drawn parallel to the IMHS vector and through the end A of the BHS vector. A vector (IMHS)$_B$ is then laid off along the dotted line from the point A and equal to the vector value of IMHS for an individual member of the lot being treated and the resultant vector RMHS for the member referred to, is drawn from the axis O to the end of the individual vector (IMHS)$_B$. Obviously, the dotted line through point A comprises the loci of the resultant vectors for all the members of a chosen lot, since IMHS varies from zero to the predetermined maximum, and for such predetermined IMHS maximum, there corresponds the vector (IMHS)$_B$ maximum equal to A—B.

A circular arc is struck about the axis O through the point A. This arc represents the weight × radius value of the balancing heavy spot vector, and under circumstances where a lot of members is being balanced by employing correcting heavy spots identical in weight × radius value with each other and with the similar value to the balancing heavy spots, this arc also represents the effect of such a correcting spot. Thus, the resultant vector RMHS (individual for each member of the lot) from the axis to the straight vertical dotted line A—B corresponds to the correction demanded for perfect balance, while a vector coincident therewith and extending to the said arc will represent the correction effect obtained simply by a correcting light spot (or its equivalent correcting heavy spot) when equal in weight × radius effect to the balancing heavy spot. The scalar difference between these vectors is the remaining error present, which will be zero at A and B, and at points between A and B will be no greater than a maximum of BHS(1−sine $\theta$) and this maximum will occur when the IMHS of the individual member is one-half of the predetermined maximum IMHS, that is, when IMHS has a mean value (IMHS mean) and the corresponding resultant intersects the dotted vertical line at one-half the distance from A to B.

It will be apparent from Fig. 35, that there will be numerous pairs of identical RMHS values respectively appearing at equal distances above and below the horizontal axis.

Under the above-described circumstances, $$\cos \theta = \frac{IMHS_{maximum}}{2BHS}$$

or its equivalent $$\frac{IMHS_{mean}}{BHS}$$

and the maximum remaining unbalance in any member of the lot would be BHS(1−sine $\theta$).

It will also be noted from the foregoing and by reference to Fig. 35, that the values of RMHS vary from equality with the value of BHS down to a lesser value which is equal to BHS sine $\theta$ (which occurs when $$IMHS = \frac{IMHS_{maximum}}{2}$$

and the RMHS value for individual members thereafter increases until it is equal to the RHS, under which conditions IMHS=IMHS$_{maximum}$. The mean RMHS will therefore be less than BHS and will equal $$\frac{BHS + BHS \text{ sine } \theta}{2}$$

By applying a CHS (or CLS) equal to the mean RMHS rather than equal to the BHS as above explained, the remaining unbalance or final error would be 50% of what it would be if CHS had been equal in value to BHS, though the latter relationships are suitable for many purposes. A dotted arc L shows such a mean RMHS value, in which circumstance the maximum remaining unbalance in any member of the lot will be equal to $$\frac{BHS}{2}(1-\text{sine } \theta)$$

instead of BHS(1−sine $\theta$).

Under circumstances wherein IMHS is either zero or maximum, then RMHS will be equal to BHS as is clearly apparent from Fig. 35, and optimum results (least remaining unbalance) will be obtained by using a CHS (or CLS) equal to $$\frac{BHS + BHS \text{ sine } \theta}{2}$$

or $$\frac{BHS}{2}(1+\text{sine } \theta)$$

which for acute values of $\theta$ will be less than BHS.

When the relationships outlined in the two immediately preceding paragraphs are employed, highly satisfactory results are achieved with the minimum removal or addition of material.

If it is desired to operate under the guidance of the teachings of Fig. 35 (wherein RMHS=BHS when IMHS=zero or maximum), basically similar vector diagrams may be constructed or the following mathematical formula may be used to determine the values of BHS (or BLS), CHS (or CLS) and $\theta$, and in which formula any desired maximum remaining unbalance expressed in UOPU (such, for instance, as 0.5, 0.8, or 1.0 UOPU), may be substituted for RU (remaining unbalance).

When it is desired to have CHS (or CLS) equal to the mean RMHS of the lot of members, then $$BHS \text{ (or } BLS) = \frac{IMHS_{maximum}^2 + 16(RU_{maximum})^2}{16(RU_{maximum})}$$

$$\cos\theta = \frac{IMHS_{maximum}}{2BHS}$$

or $$\frac{IMHS_{mean}}{BHS}$$

and $$CHS \text{ (or } CLS) = \frac{IMHS_{maximum}^2}{16(RU_{maximum})}$$

In instances where it is desired to have CHS (or BLS) equal to BHS when $\theta$ has the values just above given, then both $$BHS \text{ (or } BLS) \text{ and } CHS \text{ (or } CLS) =$$

$$\frac{IMHS_{maximum}^2 + 4(RU_{maximum})^2}{8RU_{maximum}}$$

These latter relationships while satisfactory when CHS is equal to BHS, do not effect optimum results, which optimum may be better attained by following the guidance of the teachings of Fig. 36, for reasons as will later appear.

*The showing of Fig. 36*

In connection with Fig. 35, it was shown that the least remaining unbalance occurred when the CHS (or CLS) was less than the BHS and equal to the mean RMHS. If it is desired to make the minimum weight-changes and to use identical values for both BHS and CHS, as for instance by using the same drill, cutting tool or weight additions, optimum results can best be achieved by operating under the guidance of Fig. 36.

Thus, such results may be accomplished by selecting conditions so that the mean RMHS is equal to BHS instead of being less. Fig. 36 shows these latter conditions in which RMHS varies equally above and below the value of BHS and with IMHS having a range between zero and the predetermined IMHS maximum. The vector diagram of Fig. 36 is particularly pertinent with respect to the showing of Figs. 10 to 14 inclusive.

In Fig. 36, BHS and IMHS are constructed as in Fig. 35 except that $\theta$ has been selected at a different value. The value of IMHS will appear as an IMHS vector and is laid off along the dotted line CF, which latter represents the maximum value of IMHS. Under these circumstances, the dotted line CF comprises the loci of the resultant RMHS of all the members of the lot since IMHS varies from zero to the predetermined maximum.

Under the circumstances just above referred to, $\cos\theta$ will no longer equal $$\frac{IMHS_{maximum}}{2BLS}$$

(or its equivalent $$\frac{0.5\,IMHS_{maximum}}{BLS})$$

but will equal about $$\frac{0.415\,IMHS_{maximum}}{BLS}$$

The value 0.415 may be obtained by calculating the relation of CD to DF when IMHS maximum is substantially greater than 1 UOPU.

The trigonometric values are also indicated in Fig. 36. The maximum remaining unbalance will again be $BHS$ $(1-\sin\theta)$ as it was also indicated in Fig. 35, but $\theta$ will have a different value from that indicated in Fig. 35 for a given ratio of BLS to IMHS maximum.

If it is desired to operate under the guidance of the teachings of Fig. 36, basically similar vector diagrams may be constructed for each set of conditions similar to those above discussed, or the following formula may be employed to determine the values for BHS (or BLS), CHS (or CLS) and $\theta$, and in which formula any desired maximum remaining unbalance expressed in UOPU, may be substituted for RU.

$$BHS \text{ (or } BLS) =$$

$$\frac{(.172)(IMHS_{maximum})^2 + (RU_{maximum})^2}{2(RU_{maximum})}$$

$$CHS \text{ (or } CLS) = BHS \text{ (and } BLS)$$

$$\cos\theta = \frac{0.415\,IMHS_{maximum}}{BHS}$$

*The showing of Fig. 37*

In this résumé, consideration has heretofore been given to variations of IMHS between zero and maximum.

As was pointed out in connection with the discussion of the showings of Figs. 25 to 34 inclusive, quite frequently it is found that the IMHS of the members of a given lot to be balanced will not actually vary from zero to IMHS maximum, but will rather vary from some value above zero to approximately IMHS maximum.

The type of vector diagram for guidance in obtaining optimum results under circumstances such as have just been described, is shown in Fig. 37 which is a modification of the vector diagram of Fig. 35.

In Fig. 37, the BHS vector is laid off opposite the BLS vector at angle $\theta$ from the vertical line and IMHS is laid off vertically downward from O. The scalar length of IMHS is also laid off along the illustrated broken line parallel to IMHS and extending downwardly from the outer end of the BHS vector, as was the case in the vector diagrams of Figs. 35 and 36.

In the present example, with IMHS having a minimum value other than zero, this minimum value IMHS is laid off from O and also from the outer end of the BHS vector with a scalar length PQ. The scalar length PS is then laid off equal to IMHS maximum.

Further, an arc is laid out centered at O and extending through both Q and S. The perpendicular axis TRO is also provided.

Another arc (broken lines L) is drawn also centered at O and having a radius corresponding to OU and therefore having a scalar value of $$OR + \frac{TR}{2}$$

thus making UT and UR equal to each other. When CHS is made equal to the scalar value of UO, the maximum remaining unbalance in a lot of members for the range between and including IMHS minimum and maximum, will have a value equal to UR, which latter, as shown in Fig. 37, will also be equal to TU, VQ and WS.

As actually constructed (without obvious modification), the vector diagram of Fig. 37 will lead to optimum results when conditions make it desirable to keep the weight-removals or weight-additions at a minimum where IMHS varies upwardly from a value well above zero.

Although the values of BHS, CHS and $\theta$ can be determined by constructing vectors of the character indicated in Fig. 37, the said values may also be determined mathematically.

For the purposes of simplification, the value of the minimum IMHS in the lot of similar members and the range of IMHS in the said lot will be used. IMHS range is equal to IMHS maximum minus IMHS minimum.

Under the conditions wherein IMHS has a minimum value well above zero, to achieve optimum results when conditions also make it desirable to keep the weight-removals or weight-additions at a minimum value, the following formula may be used by substituting the specific value (expressed in UOPU) of the desired maximum remaining unbalance for $RU_{max}$.

$$BHS \text{ (or } CLS) = \sqrt{IMHS_{min.}^2 + (IMHS_{min.})(IMHS_{range}) + \frac{IMHS_{range}^2}{8} + \frac{IMHS_{range}^4}{256(RU_{max.})^2} + RU_{max.}^2}$$

$$CHS \text{ (or } CLS) = \frac{(IMHS_{range})^2}{16(RU_{max.})}$$

$$\cos \theta = \frac{IMHS_{mean}}{BHS} = \frac{IMHS_{min.} + \frac{IMHS_{range}}{2}}{BHS}$$

As will be obvious, it is not necessary in order to secure satisfactory balancing, to follow the precise relationships employed for illustrative purposes in Fig. 37. The said relationships are set up for obtaining optimum results using the basic principles illustrated in the vector diagram of Fig. 35 modified for the circumstances wherein IMHS minimum is equal to a value well above zero and minimum weight-changes are desired.

It may here be further noted that the precise relationships indicated for illustrative purposes in Fig. 37 may also be modified in accordance with the teachings of the vector diagram of Fig. 36. For instance, and again in situations where IMHS minimum is equal to a value well above 0, the RMHS for IMHS minimum may be made equal to the CHS. RMHS for IMHS maximum may be made to exceed the CHS by an amount equal to the difference between the CHS and RMHS minimum.

In connection with an instance like that just above given, in lieu of employing vector diagrams, the following formula may be made use of:

$$BHS \text{ (or } BLS) = \sqrt{IMHS_{min.}^2 + 0.83(IMHS_{min.})(IMHS_{range}) + 0.086 IMHS_{range}^2 + 0.0075(IMHS_{range}^4) + 0.25}$$

$$CHS \text{ (or } CLS) = 0.086(IMHS_{range}^2) + 0.5$$

$$\cos \theta = \frac{IMHS_{min.} + 0.415(IMHS_{range})}{BHS}$$

It is to be here noted that in the various mathematical formulas previously set forth, the portions thereof relating to cosine $\theta$ were specifically concerned with securing optimum results under specific conditions all, however, falling within the framework of the present invention. It is now proposed to give an empiric generally applicable mathematical formula for cosine $\theta$ which embraces all of and may be used in lieu of any of the said previous cosine $\theta$ formulas.

$$\cos \theta = \frac{IMHS_{min.} + (0.4 \text{ to } 0.6)(IMHS_{max.} - IMHS_{min.})}{BHS}$$

or the equivalent $$\frac{IMHS_{min.} + (0.4 \text{ to } 0.6)(IMHS_{range})}{BLS}$$

In utilizing the above formula, the actual value assigned to the spread "0.4 to 0.6" should be such as to function in conjunction with the selected balancing light spot value to provide a resultant mean heavy spot value which corresponds (within 1 UOPU) to the mean value of all of the RMHS values in the lot and also the selected correcting light spot value.

From all of the foregoing considered in conjunction with the accompanying drawings, it will be apparent that for any given lot of members, all balancing light spots are substantially identical in weight $\times$ radius value with each other and are disposed at a pre-set standard acute angle ($\theta$) with respect to the inherent mean heavy spots of the members. Thus, the pre-set standard angle and the pre-set weight $\times$ radius value of the said correcting light spots are related to produce in each member of the lot, a resultant mean heavy spot which for all members of the lot, is within 1 UOPU of the mean value of all of the resultant mean heavy spot values of the lot, and also the correcting light spots.

The said correcting light spots, in turn, have a weight $\times$ radius value which is within 1 UOPU of the respective weight $\times$ radius values of any of the resultant mean heavy spots in a lot of members.

Expressed in another manner, it may be said that the aforesaid standard acute angle is such as to have its cosine substantially equal to the ratio of the sum of the weight $\times$ radius value of the inherent mean heavy spot of the member of the said lot having the least inherent unbalance and 0.4 to 0.6 of the weight $\times$ radius value of the difference or range between the said least inherent unbalance and the greatest inherent unbalance to the weight $\times$ radius value of the said standard balancing light spots.

From all of the preceding examples, it will be clearly apparent that while the respective weight $\times$ radius values of the standard balancing light spots and the standard correcting light spots may differ from each other by a plurality of UOPU's, nevertheless, the value assigned to the correcting light spots is always such as to be within 1 UOPU of the resultant mean light spot eventuating from the combined effects of the inherent unbalance and the balancing light spots.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. The method for balancing any of a plurality of similar oscillatable or rotatable members by a standardized procedure and without discriminating as to the differences between the respective weight $\times$ radius values of the inherent unbalances of the individual members of the said plurality in their condition prior to the hereinafter specified steps, every member of said plurality in such condition having less than a pre-set maximum inherent unbalance and the intended service demanding a lesser maximum permissible remaining unbalance; the said method including the steps of: poising said member wherewith its inherent mean heavy spot is vertically below the center of gravity of the member and thereby locating the said inherent mean heavy spot; changing the weight of a local portion of said member by a first standard weight × radius value and thereby producing a light spot effect at a location angularly displaced from the vertical line passing downward from the axis of rotation during poising and through the center of gravity of said member by an angle whose cosine is equal to from about 0.4 to about 0.6 of the ratio of the said maximum inherent unbalance to the said first standard weight × radius value; again poising said member wherewith the resultant heavy spot established by the said inherent unbalance and by said first standard local changing of weight is vertically below the center of gravity of the member and thereby locating a resultant mean unbalance spot; and again changing the weight by a second standard weight × radius value effective at a location substantially coincident with a radial line extending through the said resultant mean unbalance spot and therewith bringing said member within said maximum permissible remaining unbalance; the difference in weight × radius value between the said first standard weight × radius value and the said second standard weight × radius value being not substantially more than the weight × radius value of the said maximum permissible remaining unbalance.

2. The method for balancing any of a plurality of similar oscillatable or rotatable members by a standardized procedure and without discriminating as to the differences between the respective weight × radius values of the inherent unbalances of the individual members of the said plurality in their condition prior to the hereinafter specified steps, every member of said plurality in such condition having less than a pre-set maximum inherent unbalance and the intended service demanding a lesser maximum permissible remaining unbalance; the said method including the steps of: poising said member wherewith its inherent mean heavy spot is vertically below the center of gravity of the member and thereby locating the said inherent mean heavy spot; changing the weight of a local portion of said member by a first standard weight × radius value and thereby producing a light spot effect at a location angularly displaced from the vertical line passing downward from the axis of rotation during poising and through the center of gravity of said member by an angle whose cosine is from about 0.4 to about 0.6 of the ratio of the said maximum inherent unbalance to the said first standard weight × radius value; again poising said member wherewith the resultant heavy spot established by the said inherent unbalance and by said first standard local changing of weight is vertically below the center of gravity of the member and thereby locating a resultant mean unbalance spot; and again changing the weight by a second standard weight × radius value effective at a location substantially coincident with a radial line extending through the said resultant mean unbalance spot and therewith bringing said member within said maximum permissible remaining unbalance; the respective weight × radius values of the said first standard weight × radius values and the said second standard weight × radius values being substantially the same.

3. The method for balancing any of a plurality of similar oscillatable or rotatable members by a standardized procedure and without discriminating as to the differences between the respective weight × radius values of the inherent unbalances of the individual members of the said plurality in their condition prior to the hereinafter specified steps, every member of said plurality in such condition having less than a pre-set maximum inherent unbalance and the intended service demanding a lesser maximum permissible remaining unbalance; the said method including the steps of: poising said member wherewith its inherent mean heavy spot is vertically below the center of gravity of the member and thereby locating the said inherent mean heavy spot; removing material from a local portion of said member to lessen the weight thereof by a first standard weight × radius value and at a location angularly displaced from the said inherent mean heavy spot by an angle whose cosine is from about 0.4 to about 0.6 of the ratio of the said maximum inherent unbalance to the said first standard weight × radius value; again poising the said member wherewith its resultant heavy spot is vertically below the center of gravity thereby locating a resultant mean heavy spot; and again removing material from the said member to lessen the weight thereof by a second standard weight × radius value effective at a location substantially coincident with a radial line extending through the said resultant mean heavy spot and therewith bringing the said member within said maximum permissible remaining unbalance; the difference in weight × radius value between the said first standard weight × radius value and the said second standard weight × radius value being not substantially more than the weight × radius value of the said maximum permissible remaining unbalance.

4. The method for balancing any of a plurality of similar oscillatable or rotatable members by a standardized procedure and without discriminating as to the differences between the respective weight × radius values of the inherent unbalances of the individual members of the said plurality in their condition prior to the hereinafter specified steps, every member of said plurality in such condition having less than a pre-set maximum inherent unbalance and the intended service demanding a lesser maximum permissible remaining unbalance; the said method including the steps of: poising said member wherewith its inherent mean heavy spot is vertically below the center of gravity of the member and thereby locating the said inherent mean heavy spot; removing material from a local portion of said member to lessen the weight thereof by a first standard weight × radius value and at a location angularly displaced from the said inherent mean heavy spot by an angle whose cosine is from about 0.4 to about 0.6 of the ratio of the said maximum inherent unbalance to the said first standard weight × radius value; again poising the said member wherewith its resultant heavy spot is vertically below the center of gravity thereby locating a resultant mean heavy spot; and again removing material from the said member to lessen the weight thereof by a second standard weight × radius value effective at a location substantially coincident with a radial line extending through the said resultant mean heavy spot and therewith bringing the said member within the said maximum permissible remaining unbalance; the respective weight × radius values of the first standard weight × radius value and the said second standard weight × radius value being substantially the same.

5. The method for balancing any of a plurality of similar oscillatable or rotatable members by a standardized procedure not requiring discrimination as to the differences between the respective degrees of inherent unbalance of the individual members of the said plurality in their condition prior to the hereinafter specified steps, the members comprising the plurality when in such condition having less than a pre-set maximum inherent unbalance and the expected service demanding a lesser maximum permissible remaining unbalance; the said method including the steps of: locating the inherent mean heavy spot; changing the weight of a local portion of the said member by a first standard weight × radius value to provide the same with a balancing light spot angularly displaced from the inherent mean heavy spot by an acute angle from about 20° to about 85°; the said acute angle and the weight × radius value of the said balancing light spot being related to each other and to the said predetermined maximum inherent unbalance, to provide the said member with a resultant mean unbalance spot corresponding in weight × radius value, within plus or minus the weight × radius value of the said maximum permissible remaining unbalance, to the weight × radius value of the hereinafter-mentioned correcting light spot; subsequently locating the resultant mean unbalance spot of the said member; and again changing the respective weights of a local portion of the said member by a second standard weight × radius value to provide the same with a correcting light spot effective at a location substantially coincident with a radial line extending through the resultant mean unbalance spot and therewith bringing the said member within said maximum permissible remaining unbalance; the difference in weight × radius value between the said first standard weight × radius value and the said second standard weight × radius value being not substantailly more than the weight × radius value of the said maximum permissible remaining unbalance.

6. The method for balancing any of a plurality of similar oscillatable or rotatable members by a standardized procedure not requiring discrimination as to the differences between the respective weight × radius values of the inherent unbalances of the individual members in their condition prior to the hereinafter specified steps, the members comprising the said plurality in such condition having less than a pre-set maximum inherent unbalance and the intended service demanding a lesser maximum permissible remaining unbalance; the said method including the steps of: locating the inherent mean heavy spot, if any, of said member; changing the weight of a local portion of said member by a first standard weight × radius value and thereby producing a light spot effect at a location angularly displaced from the said inherent mean heavy spot, if any, of the member by an angle whose cosine is from about 0.4 to about 0.6 of the ratio of the said maximum inherent unbalance to the said first standard weight × radius value; locating the resultant mean unbalance spot; and changing the weight by a second standard weight × radius value effective at a location substantially coincident with a radial line extending through the said resultant mean unbalance spot and therewith bringing said member within said maximum permissible remaining unbalance; the difference in weight × radius value between the said first standard weight × radius value and the second standard weight × radius value being not substantially more than the weight × radius value of the said maximum permissible remaining unbalance.

7. The method for balancing any of a plurality of similar oscillatable or rotatable members by a standardized procedure not requiring discrimination as to the differences between the respective weight × radius values of the inherent unbalances of the individual members in their condition prior to the hereinafter specified steps, the members comprising the said plurality in such condition having less than a pre-set maximum inherent unbalance and the intended service demanding a lesser maximum permissible remaining unbalance; the said method including the steps of: locating the inherent mean heavy spot, if any, of said member; changing the weight of a local portion of said member by a first standard weight × radius value and thereby producing a light spot effect at a location angularly displaced from the said inherent mean heavy spot, if any, of the member by an angle whose cosine is from about 0.4 to about 0.6 of the ratio of the said maximum inherent unbalance to the said first standard weight × radius value; locating the resultant mean unbalance spot; and changing the weight by a second standard weight × radius value effective at a location substantially coincident with a radial line extending through the said resultant mean unbalance spot and therewith bringing said member within said maximum permissible remaining unbalance; the respective weight × radius values of the said first standard weight × radius value and the said second standard weight × radius value being substantially the same.

8. The method for balancing any of a plurality of similar oscillatable or rotatable members by a standardized procedure not requiring discrimination as to the differences between the weight × radius values of the inherent unbalances of the individual members in their condition prior to the hereinafter specified steps, the members of said plurality in such condition having less than a pre-set maximum unbalance and the intended service demanding a lesser maximum permissible remaining unbalance; the said method including the steps of: locating the inherent mean heavy spot, if any, of the said member; removing material from a local portion of said member to lessen the weight thereof by a first standard weight × radius value and at a location angularly displaced from the said inherent mean heavy spot, if any, of the member by an angle whose cosine is from about 0.4 to about 0.6 of the ration of the said maximum inherent unbalance to the said first standard weight × radius value; locating the resultant mean heavy spot; and removing material from the said member to lessen the weight thereof by a second standard weight × radius value effective at a location substantially coincident with a radial line extending through the said resultant mean heavy spot and therewith bringing said member within maximum permissible remaining unbalance; the difference in weight × radius value between the said first standard weight × radius value and the said second standard weight × radius value being not substantially more than the weight × radius value of the said maximum permissible remaining unbalance.

9. The method for balancing a plurality of similar oscillatable or rotatable members by a standardized procedure not requiring discrimination as to the differences between the respective weight × radius values of the inherent unbalance of the individual members of the said plurality in their condition prior to the hereinafter specified steps, the members comprising the said plurality, when in such condition, having less than a pre-set maximum inherent unbalance and the expected service demanding a lesser maximum permissible remaining unbalance; the said method including the steps of: locating the respective inherent mean heavy spots, if any, of the said members; changing the respective weights of local portions of the said plurality of members by a first standard weight × radius value substantially identical for each member to provide the same with balancing light spots angularly displaced from their respective inherent mean heavy spots, if any, by an angle whose cosine is from about 0.4 to about 0.6 of the ratio of the said maximum inherent unbalance to the said first standard weight × radius value; locating the respective resultant mean unbalance spots of the said member; and again changing the respective weights of the said members by second standard weight × radius values substantially identical for each member to provide the same with a correcting light spot effective at locations substantially coincident with a radial line extending through the respective resultant mean unbalance spots and therewith bringing each of the said plurality of members within said maximum permissible remaining unbalance; the difference in weight × radius value between the said first and second standard weight × radius values being not substantially more than the weight × radius value of the said maximum permissible remaining unbalance.

10. The method of balancing a plurality of similar oscillatable or rotatable members by a standardized procedure not requiring discrimination as to the differences between the respective values of the inherent unbalance of the individual members of the said plurality in their condition prior to the hereinafter specified steps, the members comprising the said plurality, when in such condition, having less than a pre-set maximum inherent unbalance and the expected service demanding a lesser maximum permissible remaining unbalance; the said method including the steps of: locating the respective inherent mean heavy spots, if any, of the said members; removing material respectively from local portions of the said plurality of members by a first standard weight × radius value substantially identical for each member to provide the same with balancing light spots angularly displaced from their respective mean heavy spots, if any, by an acute angle whose cosine is from about 0.4 to about 0.6 of the ratio of the said maximum inherent unbalance to the said first standard weight × radius value; locating the respective resultant mean heavy spots of the said members; and again removing material from the said members by a second standard weight × radius value substantially identical for each member to provide the same with correcting light spots effective at locations substantially coincident with a radial line extending through the respective resultant mean heavy spots and therewith bringing each of the said plurality of members within said maximum permissible remaining unbalance; the difference in weight × radius value between the said first and second standard weight × radius values being not substantially more than the weight × radius value of the said maximum permissible remaining unbalance.

11. The method for balancing a plurality of similar oscillatable or rotatable members by a standardized procedure not requiring discrimination as to the differences between the respective degrees of inherent unbalance of the individual members of the said plurality in their condition prior to the hereinafter specified steps, the members comprising the plurality when in such condition having less than a pre-set maximum inherent unbalance and the expected service demanding a lesser maximum permissible remaining unbalance; the said method including the steps of: locating the respective inherent mean heavy spots, if any, of the said members; changing the respective weights of local portions of each of the said plurality of members by a first standard weight × radius value substantially identical for each member to provide the same with balancing light spots angularly displaced from their respective inherent mean heavy spots, if any, by a pre-set standard acute angle from about 20° to about 85° and substantially identical for each member; the said pre-set standard acute angle and the weight × radius value of each of the said substantially identical standard balancing light spots being related to each other and to the said predetermined maximum inherent unbalance to produce in each of said plurality of members a resultant mean unbalance spot corresponding in weight × radius value, within plus or minus the weight × radius value of the said maximum permissible remaining unbalance, to the mean value of the weight × radius values of all the resultant mean unbalance spots of said members; subsequently locating the respective resultant mean unbalance spots of the said members; and again changing the respective weights of local portions of each of the said members by a second standard weight × radius value substantially identical for each member to provide the same with a correcting light spot effective at locations substantially coincident with a radial line extending through the respective resultant mean unbalance spots and therewith bringing each of the said plurality of members within said maximum permissible remaining unbalance; the weight × radius value of the said correcting light spot of any of said members corresponding, within the value of the said maximum permissible remaining unbalance, to the weight × radius value of the resultant mean unbalance spot of the same member.

12. The method for balancing a plurality of similar oscillatable or rotatable members by a standardized procedure not requiring discrimination as to the differences between the respective degrees of inherent unbalance of the individual members of the said plurality in their condition prior to the hereinafter specified steps, the members comprising the plurality when in such condition having less than a pre-set maximum inherent unbalance and the expected service demanding a lesser maximum permissible remaining unbalance; the said method including the steps of: locating the respective inherent mean heavy spots, if any, of the said members; changing the respective weights of local portions of each of the said plurality of members by a first standard weight × radius value substantially identical for each member to provide the same with balancing light spots angularly displaced from their respective inherent mean heavy spots, if any, by a pre-set standard acute angle whose cosine is substantially 0.4 to about 0.6 of the ratio of the said maximum inherent unbalance to the said first standard weight × radius value and substantially identical for each member; the said pre-set standard acute angle and the weight × radius value of each of the said substantially-identical standard balancing light spots being related to each other and to the said predetermined maximum inherent unbalance to produce in each of said plurality of members a resultant mean unbalance spot corresponding in weight × radius value, within plus or minus the weight × radius value of the said maximum permissible remaining unbalance, to the mean value of the weight × radius values of all the resultant mean unbalance spots of said members; subsequently locating the respective resultant mean unbalance spots of the said members; and again changing the respective weights of local portions of each of the said members by a second standard weight × radius value substantially identical for each member to provide the same with a correcting light spot effective at locations substantially coincident with a radial line extending through the respective resultant mean unbalance spots and therewith bringing each of the said plurality of members within said maximum permissible remaining unbalance; the weight × radius value of the said correcting light spots of any of said members corresponding, within the value of the said maximum permissible remaining unbalance, to the weight × radius value of the resultant mean unbalance spot of the same member.

13. The method for balancing a plurality of similar oscillatable or rotatable members by a standardized procedure not requiring discrimination as to the differences between the respective degrees of inherent unbalance of the individual members of the said plurality in their condition prior to the hereinafter specified steps, the members comprising the plurality when in such condition having less than a pre-set maximum inherent unbalance and the expected service demanding a lesser maximum permissible remaining unbalance; the said method including the steps of: locating the respective inherent mean heavy spots, if any, of the said members; changing the respective weights of local portions of each of the said plurality of members by a first standard weight × radius value substantially identical for each member to provide the same with balancing light spots angularly displaced from their respective inherent mean heavy spots, if any, by a pre-set standard acute angle from about 20° to about 85° and substantially identical for each member; the said pre-set standard acute angle and the weight × radius value of each of the said substantially-identical standard balancing light spots being related to each other and to the said predetermined maxium inherent unbalance to provide in each of said plurality of members a resultant mean unbalance spot corresponding in weight × radius value, within plus or minus the weight × radius value of the said maximum permissible remaining unbalance, to the mean of the weight × radius values of all of the resultant mean unbalance spots in the said plurality of members; subsequently locating the respective resultant mean unbalance spots of the said members; and again changing the repective weights of local portions of each of the said members by a second standard weight × radius value substantially identical for each member to provide the same with a correcting light spot effective at locations substantially coincident with a radial line extending through the respective resultant mean unbalance spots and therewith bringing each of the said plurality of members within said maximum permissible remaining unbalance; the weight × radius values of the said correcting light spots corresponding, within a weight × radius value which is less than the maximum permissible remaining unbalance, to the mean of the weight × radius values of all of the resultant mean unbalance spots produced as the result of the formation of the aforesaid balancing light spots.

14. The method for balancing a plurality of similar oscillatable or rotatable members by a standardized procedure not requiring discrimination as to the differences between the respective degrees of inherent unbalance of the individual members of the said plurality in their condition prior to the hereinafter specified steps, the members comprising the plurality when in such condition having less than a pre-set maximum inherent unbalance and the expected service demanding a lesser maximum permissible remaining unbalance; the said method including the steps of: locating the respective inherent mean heavy spots, if any, of the said members; changing the respective weights of local portions of each of the said plurality of members by a first standard weight × radius value substantially identical for each member to provide the same with balancing light spots angularly displaced from their respective inherent mean heavy spots, if any, by a pre-set standard acute angle whose cosine is substantially 0.4 to about 0.6 of the ratio of the said maximum inherent unbalance to the said first standard weight × radius value and substantially identical for each member; the said pre-set standard acute angle and the weight × radius value of each of the said substantially-identical standard balancing light spots being related to each other and to the said predetermined maximum inherent unbalance to provide in each of said plurality of members a resultant mean unbalance spot corresponding in weight × radius value, within plus or minus the weight × radius value of the said maximum permissible remaining unbalance, to the mean of the weight × radius values of all of the resultant mean unbalance spots in the said plurality of members; subsequently locating the respective resultant mean unbalance spots of the said members; and again changing the respective weights of local portions of each of the said members by a second standard weight × radius value substantially identical for each member to provide the same with a correcting light spot effective at locations substantially coincident with a radial line extending through the respective resultant mean unbalance spots and therewith bringing each of the said plurality of members within said maximum permissible remaining unbalance; the weight × radius values of the said correcting light spots corresponding, within a weight × radius value which is less than the maximum permissible remaining unbalance, to the mean of the weight × radius values of all of the resultant mean unbalance spots produced as the result of the formation of the aforesaid balancing light spots.

15. The method for balancing a plurality of similar oscillatable or rotatable members by a standardized procedure not requiring discrimination as to the differences between the respective degrees of inherent unbalance of the individual members of the said plurality in their condition prior to the hereinafter specified steps, the members comprising the plurality when in such condition having less than a pre-set maximum inherent unbalance and the expected service demanding a lesser maximum permissible remaining unbalance; the said method including the steps of: locating the respective inherent mean heavy spots, if any, of the said members; changing the respective weights of local portions of each of the said plurality of members by a first standard weight × radius value substantially identical for each member to provide the same with balancing light spots angularly displaced from their respective inherent mean heavy spots, if any, by a pre-set standard acute angle substantially identical for each member and whose cosine is substantially equal to the ratio of the sum of the weight × radius value of the inherent unbalance of the member of the said plurality having the least inherent unbalance and 0.4 to 0.6 of the weight × radius value of the difference or range between the said least inherent unbalance and the greatest inherent unbalance, to the weight × radius value of the said standard balancing light spots; the said pre-set standard acute angle and the weight × radius value of each of the said substantially-identical standard balancing light spots being related to each other and to the said predetermined maximum inherent unbalance, to provide in each of said plurality of members a resultant mean unbalance spot corresponding in weight × radius value, within plus or minus the weight × radius value of the said maximum permissible remaining unbalance, to the weight × radius value of the hereinafter-mentioned standard correcting light spots; subsequently locating the respective resultant mean unbalance spots of the said members; and again changing the respective weights of local portions of each of the said members by a second standard weight × radius value subsequentially identical for each member to provide the same with a correcting light spot effective at locations substantially coincident with a radial line extending through the respective resultant mean unbalance spots and therewith bringing each of the said plurality of members within said maximum permissible remaining unbalance; the weight × radius value of all of the said correcting light spots corresponding, within the value of the said maximum permissible remaining unbalance, to the weight × radius value of all of the respective balancing light spots.

16. The method for balancing a plurality of similar oscillatable or rotatable members by a standardized procedure not requiring discrimination as to the differences between the respective degrees of inherent unbalance of the individual members of the said plurality in their condition prior to the hereinafter specified steps, the members comprising the plurality when in such condition having less than a pre-set maximum inherent unbalance and the expected service demanding a lesser maximum permissible remaining unbalance; the said method including the steps of: locating the respective inherent mean heavy spots, if any, of the said members; changing the respective weights of local portions of each of the said plurality of members by a first standard weight × radius value substantially identical for each member to provide the same with balancing light spots angularly displaced from their respective inherent mean heavy spots, if any, by a pre-set standard acute angle substantially identical for each member and whose cosine is substantially equal to the ratio of the sum of the weight × radius value of the inherent unbalance of the member of the said plurality having the least inherent unbalance and 0.4 to 0.6 of the weight × radius value of the difference or range between the said least inherent unbalance and the greatest inherent unbalance, to the weight × radius value of the said standard balancing light spots; the said pre-set standard acute angle and the weight × radius value of each of the said substantially-identical standard balancing light spots being related to each other and to the said predetermined maximum inherent unbalance, to provide in each of said plurality of members a resultant mean unbalance spot corresponding in weight × radius value, within plus or minus the weight × radius value of the said maximum permissible remaining unbalance, to the mean value of the weight × radius values of all of the resultant mean unbalance spots in the said plurality of members; subsequently locating the respective resultant mean unbalance spots of the said members; and again changing the respective weights of local portions of each of the said members by a second standard weight × radius value substantially identical for each member to provide the same with a correcting light spot effective at locations substantially coincident with a radial line extending through the respective resultant mean unbalance spots; the weight × radius values of the said correcting light spots corresponding, within a weight × radius value which is less than the maximum permissible remaining unbalance, to the mean value of the weight × radius values of all of the resultant mean unbalance spots produced as the result of the formation of the aforesaid balancing light spots; and therewith bringing each of the said plurality of members within said maximum permisisble remaining unbalance.

17. The method for balancing a plurality of similar oscillatable or rotatable members by a standardized procedure not requiring discrimination as to the differences between the respective degrees of inherent unbalance of the individual members of the said plurality in their condition prior to the hereinafter specified steps, the members comprising the plurality when in such condition having less than a pre-set maximum inherent unbalance and the expected service demanding a lesser maximum permissible remaining unbalance; the said method including the steps of: locating the respective inherent mean heavy spots, if any, of the said members; changing, at a pre-set standard acute angle of from about 20° to about 85° from the respective inherent mean heavy spots of the said members and substantially identical for all of said plurality of members, the respective weights of local portions of each of said plurality of members by a first standard weight × radius value substantially identical for each member thus simultaneously providing each of the same with a balancing light spot and a resultant mean unbalance spot, which latter has a weight × radius value corresponding, within plus or minus the weight × radius value of the said maximum permissible remaining unbalance, to the mean value of all of the resultant mean heavy spot values in the said plurality of members; subsequently locating the respective resultant mean unbalance spots of the said members; and again changing the respective weights of local portions of each of the said members by a second standard weight × radius value substantially identical for each member to provide the same with a correcting light spot effective at locations substantially coincident with a radial line extending through the respective resultant mean unbalance spots and therewith bringing each of the said plurality of members within said maximum permissible remaining unbalance; the weight × radius value of all of the said correcting light spots corresponding, within the value of the said maximum permissible remaining unbalance, to the weight × radius value of all of the respective resultant mean heavy spots.

18. The method for balancing a plurality of similar oscillatable or rotatable members by a standardized procedure not requiring discrimination as to the differences between the respective degrees of inherent unbalance of the individual members of the said plurality in their condition prior to the hereinafter specified steps, the members comprising the plurality when in such condition having less than a pre-set maximum inherent unbalance and the expected service demanding a lesser maximum permissible remaining unbalance; the said method including the steps of: locating the respective inherent mean heavy spots, if any, of the said members; changing, at a pre-set standard acute angle of from about 20° to about 85° from the respective inherent mean heavy spots of the said members and substantially identical for all of said plurality of members, the respective weights of local portions of each of said plurality of members by a first standard weight × radius value substantially identical for each member thus simultaneously providing each of the same with a balancing light spot and a resultant mean unbalance spot, which latter has a weight × radius value corresponding, within plus or minus the weight × radius value of the said maximum permissible remaining unbalance, to the weight × radius value of the hereinafter-mentioned standard correcting light spots; subsequently locating the respective resultant mean unbalance spots of the said members; and again changing the respective weights of local portions of each of the said members by a second standard weight × radius value substantially identical for each member to provide the same with a correcting light spot effective at locations substantially coincident with a radial line extending through the respective resultant mean unbalance spots and therewith bringing each of the said plurality of members within said maximum permissible remaining unbalance; the weight × radius value of all of the said correcting light spots corresponding, within the value of the said maximum permissible remaining unbalance, to the weight × radius value of all of the respective balancing light spots.

19. The method for balancing a plurality of similar oscillatable or rotatable members by a standardized procedure not requiring discrimination as to the differences between the respective degrees of inherent unbalance of the individual members of the said plurality in their condition prior to the hereinafter specified steps, the members comprising the plurality when in such condition having less than a pre-set maximum inherent unbalance and the expected service demanding a lesser maximum permissible remaining unbalance; the said method including the steps of: locating the respective inherent mean heavy spots, if any, of the said members; changing the respective weights of local portions of each of the said plurality of members by a first standard weight × radius value substantially identical for each member to provide the same with balancing light spots angularly displaced from their respective inherent mean heavy spots, if any, by a pre-set standard acute angle from about 20° to about 85° and substantially identical for each member; the said pre-set standard acute angle and the weight × radius value of each of the said substantially-identical standard balancing light spots being related to each other and to the said predetermined maximum inherent unbalance, to provide in each of said plurality of members a resultant mean unbalance spot corresponding in weight × radius value, within plus or minus the weight × radius value of the said maximum permissible remaining unbalance, to the weight × radius value of the hereinafter-mentioned standard correcting light spots; subsequently locating the respective resultant mean unbalance spots of the said members; and again changing the respective weights of local portions of each of the said members by a second standard weight × radius value substantially identical for each member to provide the same with a correcting light spot effective at locations substantially coincident with a radial line extending through the respective resultant mean unbalance spots and therewith bringing each of the said plurality of members within said maximum permissible remaining unbalance; the weight × radius value of all of the said correcting light spots corresponding, within the value of the said maximum permissible remaining unbalance, to the weight × radius value of all of the respective balancing light spots.

20. The method for balancing a plurality of similar oscillatable or rotatable members by a standardized procedure not requiring discrimination as to the differences between the respective degrees of inherent unbalance of the individual members of the said plurality in their condition prior to the hereinafter specified steps, the members comprising the plurality when in such condition having less than a pre-set maximum inherent unbalance and the expected service demanding a lesser maximum permissible remaining unbalance; the said method including the steps of: locating the respective inherent mean heavy spots, if any, of the said members; changing the respective weights of local portions of each of the said plurality of members by a first standard weight × radius value substantially identical for each member to provide the same with balancing light spots angularly displaced from their respective inherent mean heavy spots, if any, by a pre-set standard acute angle from about 20° to about 85° and substantially identical for each member; the said pre-set standard acute angle and the weight × radius value of each of the said substantially-identical standard balancing light spots being related to each other and to the said predetermined maximum inherent unbalance, to provide in each of said plurality of members a resultant mean unbalance spot corresponding in weight × radius value, within plus or minus the weight × radius value of the said maximum permissible remaining unbalance, to the weight × radius value of the hereinafter-mentioned standard correcting light spots; subsequently locating the respective resultant mean unbalance spots of the said members; and again changing the respective weights of local portions of each of the said members by a second standard weight × radius value substantially identical for each member to provide the same with a correcting light spot effective at locations substantially coincident with a radial line extending through the respective resultant mean unbalance spots and therewith bringing each of the said plurality of members within said maximum permissible remaining unbalance; the weight × radius value of all of the said correcting light sopts being substantially equal to the weight × radius value of the said balancing light spots.

WALTER KOHLHAGEN.

REFERENCES CITED

The following references are of record in the file of this patent:

UNITED STATES PATENTS

| Number | Name | Date |
|---|---|---|
| 2,079,902 | De Witt | May 11, 1937 |
| 2,195,252 | McKinley et al. | Mar. 26, 1940 |